US010828779B2

(12) United States Patent
Marui et al.

(10) Patent No.: US 10,828,779 B2
(45) Date of Patent: Nov. 10, 2020

(54) DIAGNOSTIC DEVICE FOR LINK ACTUATION DEVICE

(71) Applicant: NTN CORPORATION, Osaka (JP)

(72) Inventors: Naoki Marui, Iwata (JP); Hiroshi Isobe, Iwata (JP); Yukihiro Nishio, Iwata (JP); Seigo Sakata, Iwata (JP)

(73) Assignee: NTN CORPORATION, Osaka (JP)

( * ) Notice: Subject to any disclaimer, the term of this patent is extended or adjusted under 35 U.S.C. 154(b) by 302 days.

(21) Appl. No.: 15/934,236

(22) Filed: Mar. 23, 2018

(65) Prior Publication Data

US 2018/0207800 A1    Jul. 26, 2018

Related U.S. Application Data

(63) Continuation of application No. PCT/JP2016/078005, filed on Sep. 23, 2016.

(30) Foreign Application Priority Data

| Sep. 25, 2015 | (JP) | 2015-187735 |
| Dec. 16, 2015 | (JP) | 2015-244948 |
| Sep. 21, 2016 | (JP) | 2016-184573 |

(51) Int. Cl.
*A61B 90/25* (2016.01)
*B25J 9/16* (2006.01)
(Continued)

(52) U.S. Cl.
CPC .............. *B25J 9/1674* (2013.01); *B25J 9/108* (2013.01); *B25J 9/1615* (2013.01); *B25J 9/1623* (2013.01);
(Continued)

(58) Field of Classification Search
CPC ........ B25J 9/1674; B25J 9/108; B25J 9/1615; B25J 9/1633; B25J 13/085; B25J 19/0095;
(Continued)

(56) References Cited

U.S. PATENT DOCUMENTS

| 4,925,312 A | * | 5/1990 | Onaga | ................... | B25J 9/1633 |
| | | | | | 318/568.22 |
| 5,893,296 A | | 4/1999 | Rosheim | | |

(Continued)

FOREIGN PATENT DOCUMENTS

| CN | 104024694 A | 9/2014 |
| EP | 0 987 087 A2 | 3/2000 |

(Continued)

OTHER PUBLICATIONS

Aalasubramanian et al., Variation in compliance in two classes of two-link underactuated mechanisms, 2011, IEEE, p. 3497-3504 (Year: 2011).*

(Continued)

*Primary Examiner* — McDieunel Marc

(57) ABSTRACT

A diagnostic device is to be used for a link actuation device. A distal end side link hub to be coupled to a proximal end side link hub via three or more link mechanisms such that posture of the distal end side link hub is changeable. Each of the three or more link mechanisms is to be associated with a respective one of actuators. A predetermined action is to be carried out under a predetermined condition by driving each of the actuators. A preload applicator is to cause a preload to be applied to the link actuation device. A torque detector is to detect a drive torque of each of the actuators while a preload is being applied. A determiner is to determine whether or not the torque that is detected by the torque (Continued)

detector lies within a predetermined range. A notifier is to notify the determination result.

8 Claims, 14 Drawing Sheets

(51) Int. Cl.
| | | |
|---|---|---|
| *F16H 21/46* | (2006.01) | |
| *B25J 9/10* | (2006.01) | |
| *B25J 13/08* | (2006.01) | |
| *B25J 19/00* | (2006.01) | |

(52) U.S. Cl.
CPC ............ *B25J 9/1633* (2013.01); *B25J 13/085* (2013.01); *B25J 19/0095* (2013.01); *F16H 21/46* (2013.01)

(58) Field of Classification Search
CPC .......... B25J 9/161; B25J 9/1676; B25J 9/046; F16H 21/46; A61B 90/25; A61B 1/00149; A61B 34/30
See application file for complete search history.

(56) References Cited

U.S. PATENT DOCUMENTS

| | | | | |
|---|---|---|---|---|
| 6,236,906 | B1* | 5/2001 | Muller | B25J 9/1676 700/258 |
| 6,711,468 | B2* | 3/2004 | Bottero | B25J 9/161 318/568.1 |
| 7,155,316 | B2* | 12/2006 | Sutherland | A61B 90/25 700/248 |
| 8,204,626 | B2* | 6/2012 | Yoshiike | B62D 57/032 250/332 |
| 8,369,992 | B2* | 2/2013 | Barajas | B25J 9/1674 601/33 |
| 9,321,177 | B2 | 4/2016 | Ikeda et al. | |
| 10,022,827 | B2 | 7/2018 | Isobe et al. | |
| 2008/0191654 | A1 | 8/2008 | Blanc et al. | |
| 2011/0319815 | A1* | 12/2011 | Roelle | A61B 1/00149 604/95.01 |
| 2011/0319910 | A1* | 12/2011 | Roelle | A61B 34/30 606/130 |
| 2012/0065781 | A1 | 3/2012 | Ikeda et al. | |
| 2014/0223722 | A1 | 8/2014 | Isobe et al. | |
| 2019/0184551 | A1* | 6/2019 | Shafer | B25J 9/046 |

FOREIGN PATENT DOCUMENTS

| | | |
|---|---|---|
| JP | 10-14300 A | 1/1998 |
| JP | 2000-94245 A | 4/2000 |
| JP | 2000-134716 A | 5/2000 |
| JP | 2001-254798 | 9/2001 |
| JP | 2005-226777 A | 8/2005 |
| JP | 2007-301680 A | 11/2007 |
| JP | 2012-61535 A | 3/2012 |
| JP | 2015-24478 | 2/2015 |

OTHER PUBLICATIONS

Chiri et al., Mechatronic Design and Characterization of the Index Finger Module of a Hand Exoskeleton for Post-Stroke Rehabilitation, 2011, IEEE, p. 884-894 (Year: 2011).*

Brokaw et al., Hand Spring Operated Movement Enhancer (HandSOME): A Portable, Passive Hand Exoskeleton for Stroke Rehabilitation, 2011, IEEE, p. 391-399 (Year: 2011).*

Guckert et al., Measuring the angle of a rotating link through compliant driving tendons, 2008, IEEE, p. 001345-001348 (Year: 2008).*

International Search Report dated Nov. 1, 2016 in corresponding International Patent Application No. PCT/JP2016/078005.

English Translation by WIPO of the International Preliminary Report on Patentability for corresponding International Patent Application No. PCT/JP2016/078005, dated Apr. 5, 2018, 6 pgs.

Notice of Reasons for Refusal, dated May 26, 2020, in corresponding Japanese Application No. 2016-184753 (10 pp.).

Office Action, dated Aug. 27, 2020, in corresponding Chinese Application No. 201680054817.4 (16 pp.).

* cited by examiner

DIAGNOSTIC DEVICE FOR LINK ACTUATION DEVICE

CROSS REFERENCE TO THE RELATED APPLICATION

This application is a continuation application, under 35 U.S.C. § 111(a) of international patent application No. PCT/JP2016/078005, filed Sep. 23, 2016, which claims priority to Japanese patent applications No. 2015-187735, filed Sep. 25, 2015, No. 2015-244948, filed Dec. 16, 2015 and No. 2016-184573, filed Sep. 21, 2016, the entire disclosures of which are herein incorporated by reference as a part of this application.

BACKGROUND OF THE INVENTION

Field of the Invention

The present invention relates to a diagnostic device for a link actuation device—for example, a link actuation device with a precise and wide operating range required for use in medical devices and industrial devices, etc.—which diagnostic device imparts excellent maintainability to the link actuation device by allowing for diagnosis of degradation or damages of parts of the link actuation device.

Description of Related Art

In the past, in order to provide a link actuation device capable of a wide range of operation that can be used in medical devices and industrial devices, etc., a device has been proposed in which distal end side and proximal end side link hubs are coupled to each other via three or more link mechanisms in such a way that posture thereof can be changed (see, for example, Patent Documents 1 to 4).

RELATED DOCUMENT

Patent Document

[Patent Document 1] JP Laid-Open Patent Publication No. H10-014300
[Patent Document 2] JP Laid-Open Patent Publication No. 2000-134716
[Patent Document 3] JP Laid-Open Patent Publication No. 2000-094245
[Patent Document 4] U.S. Pat. No. 5,893,296

A variety of control methods have been proposed for this kind of link actuation device. However, the idea of informing a user of the degradation status of parts—such as a gear or a bearing—composing a link actuation device when degradation of the parts occurs has not yet been proposed. If the degradation of a gear or a bearing, etc. progresses and once their breakage occurs, the link actuation device may no longer be operable, and an extended period of time may become necessary for maintenance. Therefore, it is desirable that possible degradation of parts be diagnosed and a user be informed of this, before the device is rendered inoperable due to, for example, breakage of the parts.

SUMMARY OF THE INVENTION

An object of the present invention is to overcome the aforementioned challenge and, namely, to provide a diagnostic device for a link actuation device, which diagnostic device can improve maintainability of the link actuation device—possibly having an allowance such as backlash in a drive train thereof—by accurately diagnosing the degradation status of parts thereof and informing a user of this, before the device is rendered inoperable due to, for example, breakage of the parts.

In a diagnostic device 51 for a link actuation device 1 in accordance with the present invention, the link actuation device 1 includes: a proximal end side link hub 14; a distal end side link hub 15; three or more link mechanisms 11 to 13, with the distal end side link hub 15 being coupled to the proximal end side link hub 14 via the three or more link mechanisms 11 to 13 such that posture of the distal end side link hub 15 can be changed; and posture control actuators 30 that cooperate to arbitrarily change distal end posture which is defined as posture of the distal end side link hub 15, relative to the proximal end side link hub 14, with each of the three or more link mechanisms 11 to 13 being associated with a respective one of the posture control actuators 30, in which case each of the link mechanisms 11 to 13 includes: a proximal side end link member 11a, 12a or 13a having opposite ends, with one end of the opposite ends being pivotably coupled to the proximal end side link hub 14; a distal side end link member 11c, 12c or 13c having opposite ends, with one end of the opposite ends being pivotably coupled to the distal end side link hub 15; and an intermediate link member 11b, 12b or 13b having opposite ends that are pivotably coupled to the other end of the opposite ends of the proximal side end link member 11a, 12a or 13a and the other end of the opposite ends of the distal side end link member 11c, 12c or 13c, respectively.

Meanwhile, the diagnostic device 51 includes: a preload applicator 52 configured to cause each of the actuators 30 to be driven to apply a preload to the link actuation device 1; a torque detector 53 configured to detect a drive torque of each of the actuators 30; a determiner 54 configured to determine whether or not the drive torque of each of the actuators 30, that is detected as the link actuation device 1 carries out a predetermined action under a predetermined condition, lies within a predetermined range; and a notifier 56 configured to send a notification to a notification content display 58, with the notification indicating a determination result provided by the determiner 54. It should be noted that, although the term "posture" encompasses both a position and an orientation, simply the term "position" may hereinafter be used for the same purpose.

Positioning of the link actuation device 1 having the aforementioned construction may be accomplished by operating the actuators 30 of the three or more link mechanisms 11 to 13 in a synchronous manner. For instance, the link actuation device 1 may be caused to carry out the predetermined action under the predetermined condition during normal operating conditions thereof (i.e., during normal operating conditions of parts composing the link actuation device 1), so that the drive torques can be measured during that action and can be stored in advance. The determiner 54 may compare those drive torques, that are detected as the same action is carried out under the same condition, against that set of stored during-normal-operating conditions torques and may determine whether or not a deviation therebetween lies within the predetermined range. The notifier 56 may send a determination result, provided by the determiner 54, to the notification content display 58. The notifier 56 may be configured to send a notification only when it does not lie within the predetermined range.

The link actuation device 1 with the three or more link mechanisms 11 to 13 can accomplish a wide range of posture changes as well as complicated actions. In the meantime, gears or other revolute pairs and mechanisms, etc. may involve backlash, looseness and so on. The effect of such backlash and looseness on the torques may vary considerably, depending on, for example, what posture is taken by each of the links at the time of and/or before the torque detection. For this reason, it can be difficult to accurately determine the degradation status of parts merely by monitoring the motor torques.

Therefore, according to the present invention, the preload applicator 52 may cause a preload to be applied to the link actuation device 1, and in addition, the torque detector 53 may detect the drive torque of each of the actuators 30 as the link actuation device carries out the predetermined action under the predetermined condition. The determiner 54 may determine whether or not these drive torques lie within predetermined ranges. By applying a preload, the effect of backlash and looseness on the torques can be counteracted. Also note that, when there is any abnormality-occurring portion in the link actuation device 1, torque deviation from during-normal-operating-conditions torques tends to occur along more than one axis at the same time. By making determinations in the aforementioned manner and sending a determination result to the notification content display 58, it is possible to accurately detect the degradation status of parts composing the link actuation device 1.

Besides, since each of the link mechanisms 11-13 is associated with a respective one of the actuators 30, it is possible to more accurately determine the degradation status of the link actuation device 1. In other words, although this type of link actuation devices 1 can also be constructed using two actuators, it may be difficult to identify which part(s) is/are exhibiting degradation based on detection of the torques of the two actuators 30. On the other hand, when each of the link mechanisms 11 to 13 is associated with a respective one of the actuators 30, it is possible to identify which one of the link mechanisms 11 to 13 contains the degraded part(s) based on which one of the actuators 30 is associated therewith, thus making it possible to more accurately and easily detect the degradation status.

In this way, it is possible to accurately diagnose the degradation status of parts of the device—possibly having an allowance such as backlash in a drive train thereof—and inform a user of this, before the device is rendered inoperable due to, for example, breakage of the parts. This allows for replacement of parts before the device is rendered inoperable, thus achieving improved maintainability of the device.

In the present invention, the predetermined condition and the predetermined action may be a condition and an action that can be defined in any manner as desired. However, the predetermined condition may include, for example, at least one of: that the preload is applied; that a load acting on the distal side end link member in the link actuation device 1 lies within a defined range; and that a velocity, at which the distal side end link member moves, lies within a defined range, and the predetermined action may include one of: that the link actuation device 1 moves through a predetermined path; and that the link actuation device 1 moves between predetermined positions. As described earlier, the link actuation device 1 can be caused to carry out the predetermined action under the predetermined condition during normal operating conditions of parts composing the link actuation device 1, so that the drive torques can be measured during that action and can be stored in advance. Accordingly, even when the link actuation device 1 is in the middle of carrying out an action, accurate determination of whether or not there is abnormality is possible by comparing those drive torques against that set of during-normal-operating conditions torques which are previously detected as the same action is carried out under the same condition.

In the present invention, the predetermined condition may include that the preload is applied, and the predetermined action may include that the link actuation device 1 is positioned. Positioning of the link actuation device 1 having the aforementioned construction may be accomplished by operating the actuators 30 of the three or more link mechanisms 11 to 13 in a synchronous manner. Here, if a preload is applied to the link actuation device 1 in advance, the amount of the preload will decrease once, for example, a wear occurs in constituent parts thereof such as a gear or a bearing. Such a decrease in the amount of the preload may, in turn, result in a decrease of the torque of, for example, the motors 30a of the actuators 30 that actuate the link mechanisms 11a to 11c.

On the other hand, if a foreign matter is caught in, for example, a gearing, the torque can increase in contrast to the case just described, when the link actuation device 1 is positioned. When the link actuation device 1 is positioned, the torque detector 53 may detect the drive torque of each of the actuators 30 while the preload is being applied thereto. Thus, the torque can always be detected under the same condition at each time. A diagnostic device designed in accordance with this construction may take advantage of this and may monitor the drive torque of, for example, the motors 30a of the actuators 30, and may, upon detecting torque decrease or torque increase that goes above or below the predetermined range when the link actuation device 1 is positioned, send a notification, such as warning of, for example, such torque decrease or torque increase, to the notification content display 58 which may comprise, for example, a touch panel.

In the present invention, each of the actuators 30 may comprise an electric servo motor. For example, each of the actuators 30 may comprise: a rotary actuator that includes an electric servo motor; and a speed reducer mechanism 31 configured to produce rotation at a speed that is reduced with respect to rotation produced by the servo motor. By designing each of the actuators 30 to comprise a rotary actuator with an electric servo motor, actuation can be effected with excellent controllability while the aforementioned abnormality determination can also be accurately performed.

In the present invention, application of the preload to the link actuation device 1 by the preload applicator 52 may include positioning the link actuation device 1 in an initial posture thereof, and effecting for each one of pairs formed by elements composing the link actuation device 1, which elements are movable to each other in response to actuation of the actuators 30, to be applied a force such that each movable member is brought closer to the other member within an allowance in the each one of the pairs. By positioning the link actuation device 1 in an initial posture thereof and, for each one of the pairs, applying a force such that one member is brought closer to the other member within an allowance thereof, the drive torque can always be detected under the same condition at each time, thereby making it possible to perform determination of the degradation status more accurately.

In the present invention, the diagnostic device 51 may further include a memory 55 configured to store the number of times in which it has been determined by the determiner 54 to lie outside the predetermined range, and the notifier 56 may be configured to send a notification different from said notification if the number of times, in which it has been determined to lie outside the predetermined range, exceeds a threshold. An increase in the drive torque detected by the torque detector 53 may possibly occur due to some temporary factors. Yet, if the detected torque frequently goes outside the predetermined range, it is highly probable that the constituent parts are exhibiting degradation such as wear. Therefore, by sending, if the number of times in which it has been determined to lie outside the predetermined range exceeds a threshold, a notification different from said notification—for example, a notification that it is time to replace parts—the acknowledgement that replacement of parts is urgent and that it is not a mere temporary abnormality can be facilitated with reliability. This allows for replacement of parts before the device is rendered inoperable, thus achieving improved maintainability of the device.

In the present invention, the diagnostic device 51 may further include a memory 55 configured to store the duration of a period for which it has been determined by the determiner 54 to lie outside the predetermined range, and the notifier 56 may be configured to send a notification different from said notification if the duration of the period, for which it has been determined to lie outside the predetermined range, is shorter than a threshold. As just described, an increase in the drive torque detected by the torque detector 53 may possibly occur due to some temporary factors. Yet, if the detected torque goes outside the predetermined range for a relatively short period, it is highly probable that the constituent parts are exhibiting degradation such as wear. Therefore, by sending, if the duration of the period for which it has been determined to lie outside the predetermined range is shorter than a threshold, a notification different from said notification—for example, a notification that it is time to replace parts—the acknowledgement that replacement of parts is urgent and that it is not a mere temporary abnormality can be facilitated with reliability. This allows for replacement of parts before the device is rendered inoperable, thus achieving improved maintainability of the device.

In the present invention, the notification content display 58 may comprise an operation panel 57 equipped to an operation console 59 for operating the link actuation device 1. In such a configuration, a notification indicating degradation of parts can be displayed on the operation panel 57 for the operation console 59. In this way, a user of the link actuation device 1 can easily notice the notification indicating degradation of parts.

Any combination of at least two features disclosed in the appended claims and/or the specification and/or the accompanying drawings should be construed as being included within the scope of the present invention. In particular, any combination of at least two claims from the appended claims should be equally construed as being included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference signs are used to denote like parts or corresponding parts throughout the different figures, and:

DESCRIPTION OF EMBODIMENTS

Figure 1:
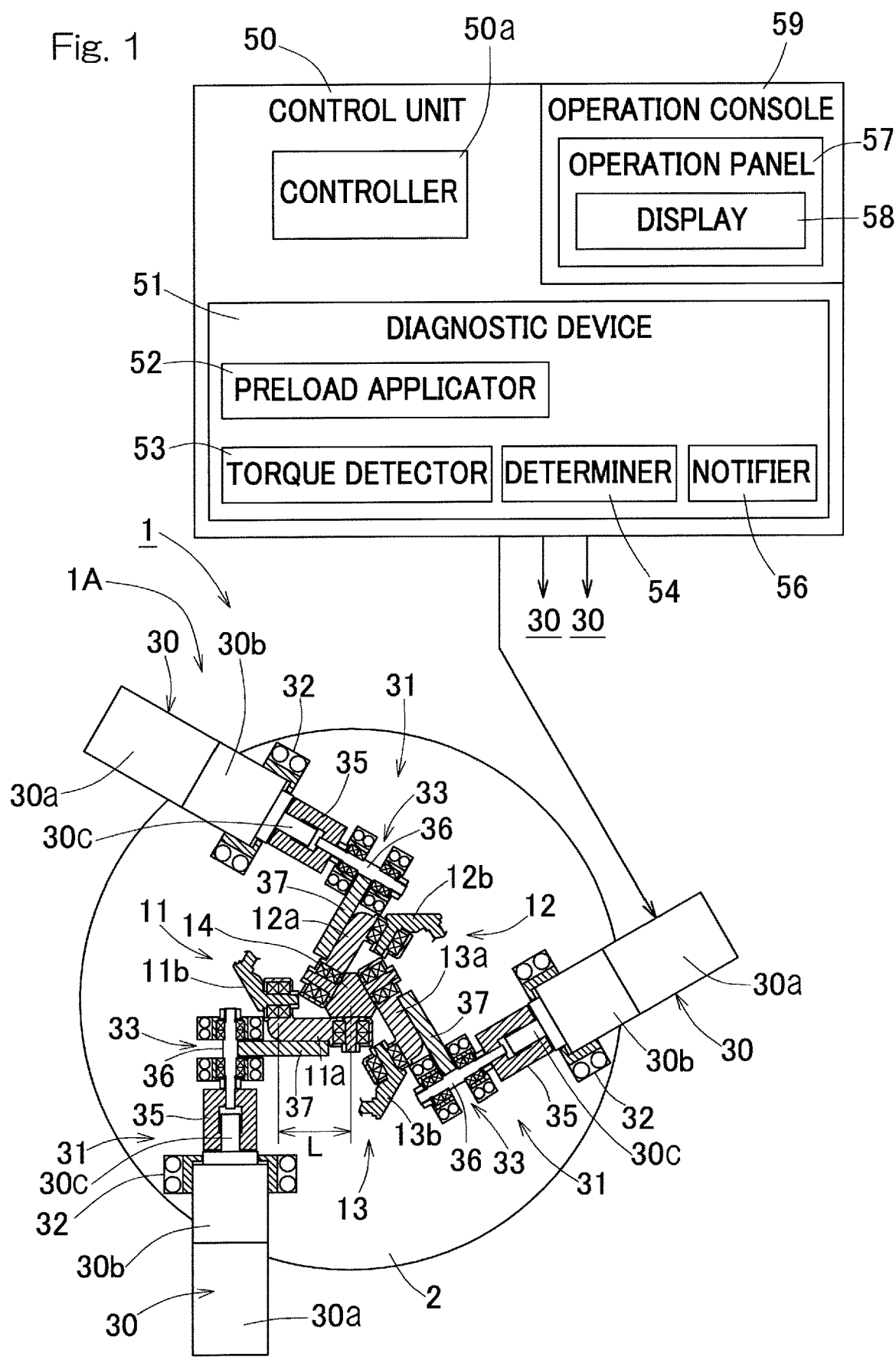
FIG. 1 is a set of explanatory diagrams including a block diagram illustrating the general concept of a diagnostic device for a link actuation device and a horizontal cross section of the link actuation device, in accordance with an embodiment of the present invention.

An embodiment of the present invention will be described in connection with FIG. 1 to FIG. 11. The illustrated diagnostic device 51 for a link actuation device can be a device used to diagnose the degradation status and/or possible damages of parts composing the link actuation device 1. The link actuation device 1, which is the subject of the diagnosis, may include a parallel link mechanism 1A and a control unit 50 that can control the parallel link mechanism 1A, with the parallel link mechanism 1A being the one on which the diagnosis is based.

The parallel link mechanism 1A may include: a proximal end side link hub 14; a distal end side link hub 15; and three link mechanisms 11, 12 and 13, with the distal end side link hub 15 being coupled to the proximal end side link hub 14 via the three link mechanisms 11, 12 and 13 such that posture of the distal end side link hub 15 can be changed. Each of the link mechanisms 11, 12 and 13 includes: a proximal side end link member 11a, 12a or 13a having opposite ends, with one end of the opposite ends being pivotably coupled to the proximal end side link hub 14; a distal side end link member 11c, 12c or 13c having opposite ends, with one end of the opposite ends being pivotably coupled to the distal end side link hub 15; and an intermediate link member 11b, 12b or 13b having opposite ends that are pivotably coupled to the other end of the opposite ends of the proximal side end link member 11a, 12a or 13a and the other end of the opposite ends of the distal side end link member 11c, 12c or 13c, respectively. Each of the three link mechanisms 11, 12 and 13 may be associated with a respective one of electric actuators 30 that cooperate to arbitrarily change distal end posture which is defined as posture of the distal end side link hub 15, relative to the proximal end side link hub 14.

Referring to FIG. 1, the actuators 30 may, for example, comprise a rotary actuator—in particular, a servo motor that includes a motor 30a and a speed reducer 30b—and may be fixedly mounted to a pedestal 2 via motor fixation members 32. Speed reducer mechanisms 31 may each be formed of the aforementioned speed reducer 30b of a respective one of the actuators 30 and a gearing speed reducer 33.

The control unit 50 may include a controller 50a therein to control the motor 30a of each of the actuators 30 of the parallel link mechanism 1A in accordance with a command such as a positioning command from a superordinate control unit (not shown) or in accordance with an entered input such as a positioning command from an operation console 59. The positioning command can be, for example, a command that specifies a destination coordinate value of the distal end side link hub 15. The controller 50a may provide a servo system for each axis (i.e., each one of the actuators 30), with positional feedback functionality.

Now the diagnostic device 51 will be explained. The diagnostic device 51 may be implemented in the control unit 50. It should be emphasized that a more particular configuration of the parallel link mechanism 1A will be discussed later. The diagnostic device 51 may include a preload applicator 52, a torque detector 53, a determiner 54 and a notifier 56.

The preload applicator 52 may cause the motor 30a of each of the actuators 30 to be driven in such a way to position the link actuation device 1 in an initial posture thereof and apply a preload to the link actuation device 1. The preload applicator 52 may send a command for this preload application to the controller 50a, so that it can be executed by the controller 50a. The initial posture may be defined in any manner as desired, and a posture suitable for diagnosis of the link actuation device 1—for example, a posture that facilitates application of the aforementioned preload—may be chosen. Application of the preload by the preload applicator 52 may include positioning the link actuation device 1 in the aforementioned initial posture thereof, and effecting for each one of pairs such as revolute pairs formed by elements (e.g., a gear or a bearing) composing the link actuation device 1, which elements are movable to each other in response to actuation of the actuators 30, to be applied a force such that each movable member is brought closer to the other member within an allowance in the each one of the pairs.

When the link actuation device 1 is positioned, the torque detector 53 may detect a drive torque of the motor 30a of each of the actuators 30 while the preload is being applied thereto. Detection of a drive torque may be accomplished, for example, by obtaining a current value sensed by a current sensor (not shown) that is arranged in a drive circuit for each motor 30a.

The determiner 54 may determine whether or not the drive torque, that is detected by the torque detector 53 as the link actuation device 1 carries out a predetermined action under a predetermined condition, lies within a predetermined range. The predetermined range may be defined appropriately, based on experiments or in accordance with the design. The predetermined range may be defined appropriately, for example, in accordance with the design. The predetermined range may be defined by only specifying a threshold that identifies an upper limit of the range. The determiner 54 may store a plurality of combinations of: the predetermined action; the predetermined condition; and values used therefor. For example, in the case that the link actuation device 1 is designed to only carry out a predetermined number of actions, the determiner 54 may store only the corresponding number of such combinations. In the case that one or more specific actions of the link actuation device 1 can be used for torque measurement-based, abnormality determination, the determiner 54 may similarly store only the corresponding number of such combinations. In a determination step, the type of the performed action may be identified using an appropriate method, and the values for this particular type of action may be used for the determination.

The predetermined condition and the predetermined action may be defined in any manner as desired. However, the predetermined condition may include, for example, at least one of: that the preload is applied; that a load acting on the distal side end link member 11c, 12c or 13c in the link actuation device 1 lies within a defined range; and that a velocity at which the distal side end link member moves lies within a defined range, and the predetermined action may include: that the link actuation device 1 moves through a predetermined path. As described earlier, the link actuation device 1 can be caused to carry out the predetermined action under the predetermined condition during normal operating conditions of parts composing the link actuation device 1, so that the drive torques can be measured during that action and can be stored in advance. By so doing, even when the link actuation device 1 is in the middle of carrying out an action, accurate determination of whether or not there is abnormality is possible by comparing those drive torques against that set of during-normal-operating conditions torques which are previously detected as the same action is carried out under the same condition. It should be noted that the expression "during that action (i.e., the predetermined action)" used in this context encompasses a positioning action.

Moreover, the predetermined condition may include that the preload is applied, and the predetermined action may include that the link actuation device 1 is positioned.

The notifier 56 may send a notification in the form of a determination result provided by the determiner 54, to a notification content display 58 (display 58 in FIGS. 1-3), so that it can be displayed on the notification content display 58. As will be described later, the notifier 56 may not only be configured to send such a notification but may also have the function of determining whether to send such a notification depending on circumstances and/or of generating a command for e.g., initialization. The notification content display 58 may, for example, comprise an operation panel 57 in an operation console 59 that may be attached to the control unit 50. The operation panel 57 may, for example, comprise a touch panel such as a liquid crystal display and may be designed to display an image as well as to allow inputs to be entered for the controller 50*a* and others.

Figure 2:
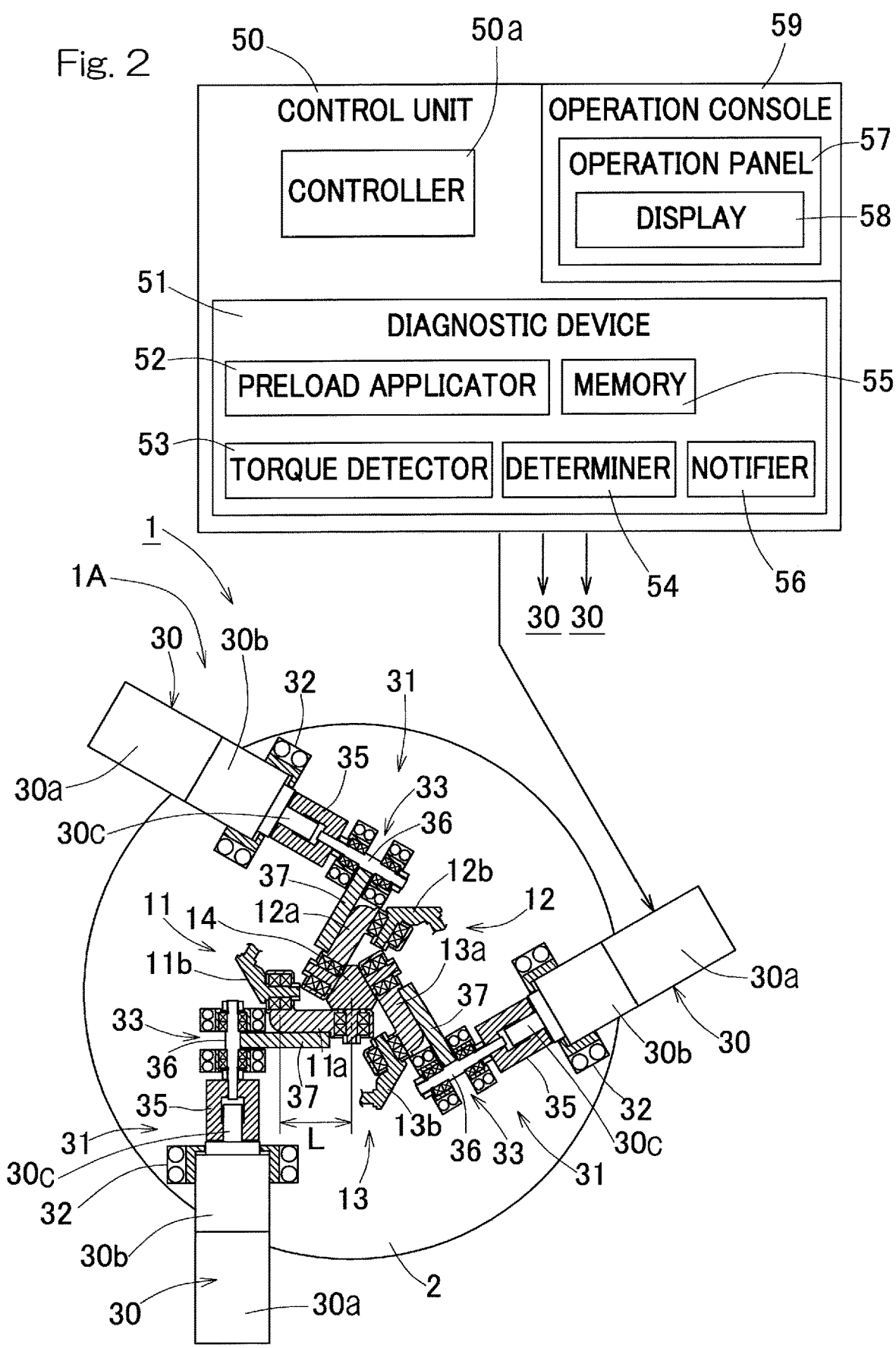
FIG. 2 is a set of explanatory diagrams including a block diagram illustrating the general concept of a diagnostic device for a link actuation device and a horizontal cross section of the link actuation device, in accordance with a modification of the embodiment of FIG. 1 in which part of the embodiment has been modified.

The diagnostic device 51 for a link actuation device having the aforementioned configuration may include a memory 55, as shown in FIG. 2. The memory 55 may store the "number of times" in which it has been determined by the determiner 54 to lie outside the predetermined range. The notifier 56 may send a notification different from the aforementioned notification—for example, a notification encouraging replacement of parts—if the "number of times" in which it has been determined to lie outside the predetermined range exceeds a threshold.

Also, for the determination criterion, a "period" may be used as a determination criterion instead of the "number of times." That is, the memory 55 may store the duration of a period for which it has been determined by the determiner 54 to lie outside the predetermined range. The notifier 56 may send a notification different from the aforementioned notification—for example, a notification encouraging replacement of parts—if the duration of the period for which it has been determined to lie outside the predetermined range is shorter than a threshold. In other words, the notifier 56 may be configured to send a notification different from the aforementioned notification if the duration of the period for which it has been determined to lie outside the predetermined range is less than the threshold.

Figure 3:
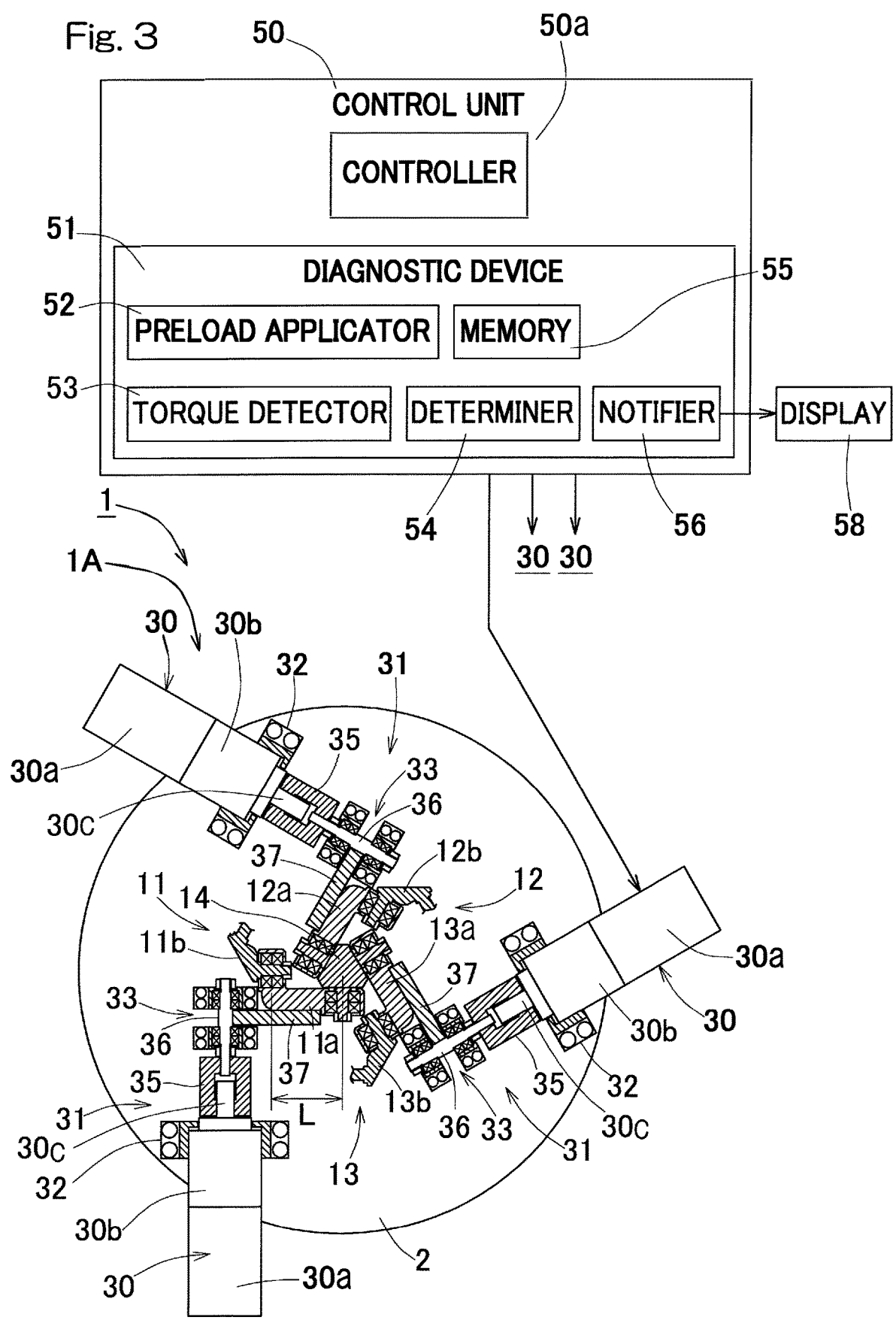
FIG. 3 is a set of explanatory diagrams including a block diagram illustrating the general concept of a diagnostic device for a link actuation device and a horizontal cross section of the link actuation device, in accordance with another modification of the embodiment of FIG. 1 in which a part of the embodiment that is different from that in FIG. 2 has been modified.

The notification content display 58 may be provided at a location remote from the control unit 50, as shown in FIG. 3. For example, the notification content display 58 may be provided in a room—for example, a centralized control room—that is different from the room where the link actuation device 1 is installed and may even comprise an image display device, such as on a computer, that is operatively connected via a wide area communication network.

The overview of operation of the diagnostic device 51 having the aforementioned configuration will be described. In the link actuation device 1, if a preload is applied to the link actuation device 1 in advance, the amount of the preload will decrease once degradation such as a wear occurs in constituent parts thereof such as a gear or a bearing. Such a decrease in the amount of the preload may, in turn, result in a decrease of the torque of, for example, the motors 30*a* of the actuators 30 that actuate the link mechanisms 11 to 13. More specifically, positioning of the link actuation device 1 may be accomplished by operating three motors 30*a* in a synchronous manner. Thus, if constituent parts thereof are exhibiting degradation, the motor torque thereof may decrease when the link actuation device 1 is positioned. On the other hand, if a foreign matter is caught in, for example, a gear, the torque can increase when the link actuation device 1 is positioned.

The diagnostic device 51 for the link actuation device 1 may take advantage of such torque change and may monitor through the torque detector 53 the torque of the motors 30*a* of the actuators 30. Upon detecting in the determiner 54 torque decrease or torque increase that goes above or below the predetermined range when the link actuation device 1 is positioned, the determiner 54 sends a notification such as warning of, for example, such torque decrease or torque increase, to the notification content display 58 which may comprise, for example, a touch panel. If such torque decrease or torque increase frequently takes place, a notification that it is time to replace parts may be sent to the notification content display 58, as will be described later.

The diagnostic device 51 for the link actuation device 1 may perform, prior to an initial actuation of the link actuation device 1 after completion of assembly thereof, an initialization step in which a reference torque at an initial position of the link actuation device 1 can be set. For example, the link actuation device 1 may be caused to be positioned in a predetermined position, in such a way to obtain a fixed posture of the distal end side link hub 15—in particular, in such a way to press the distal end side link hub 15 against a certain object. The initialization step may be performed again if the torque of the motors 30*a* goes above or below the predetermined range during subsequent use, so that the reference torque can be newly reset.

If, within a predetermined period of operation, torque increase or decrease of the motors frequently takes place and the initialization step has been performed at least a certain number of times, it may be determined that there is degradation or abnormality of parts, and a notification that it is time to replace parts may be generated to encourage a user to replace parts. By informing a user that it is time to replace parts before breakage of, for example, a gear occurs, replacement of parts is possible before the device is rendered inoperable, thus achieving improved maintainability of the device. Such a notification may be sent to the operation panel 57 in the operation console 59 for the link actuation device 1, thereby making it more recognizable for a user.

Figure 9:
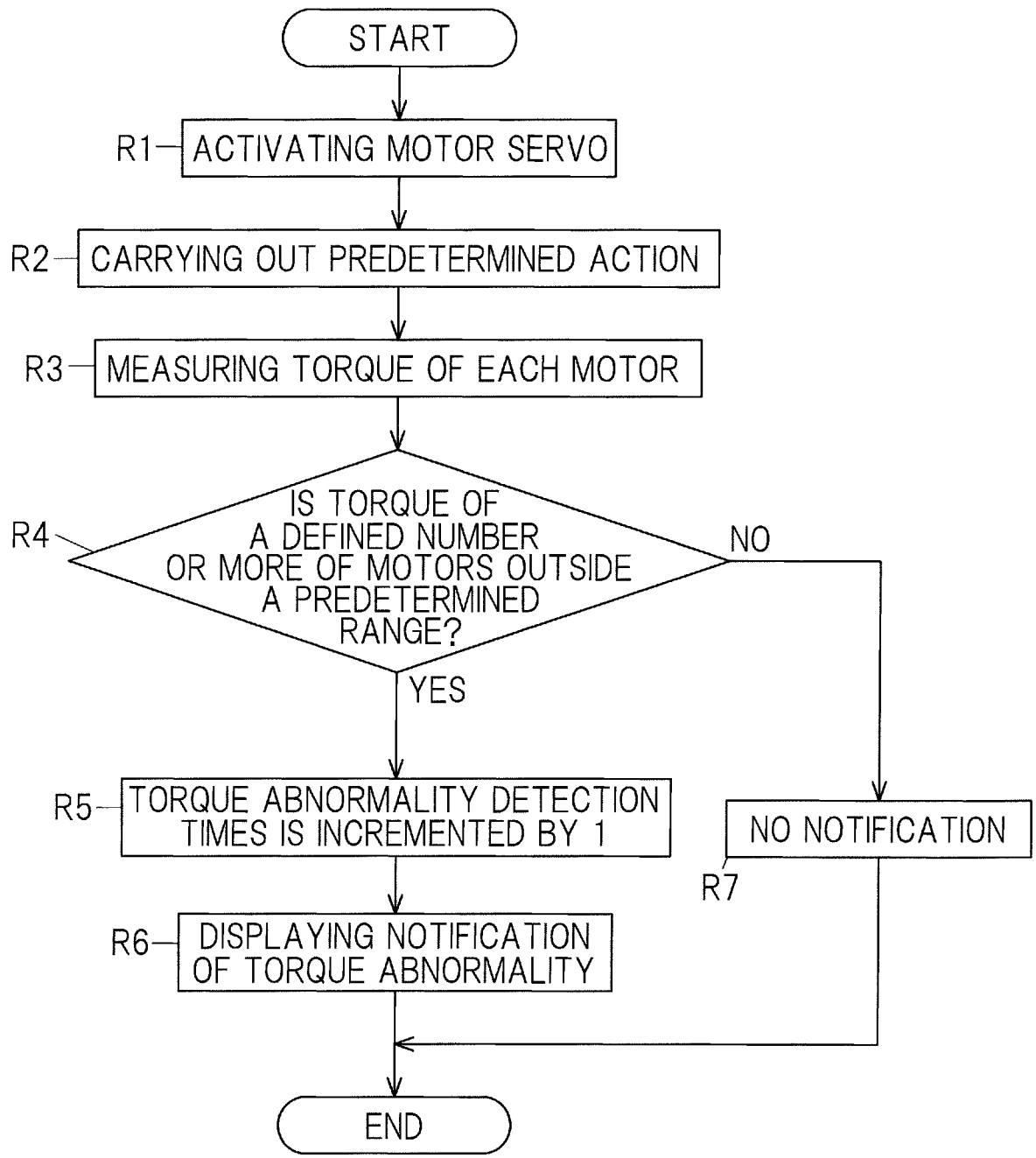
FIG. 9 shows a flow chart of process steps that may be performed by the diagnostic device for the link actuation device.

Now, a particular example of operation of the diagnostic device 51 having the aforementioned configuration will be described in connection with FIG. 9 to FIG. 11. Referring to FIG. 9, the motor servo of the controller 50*a* may be activated in response to a command from the preload applicator 52 illustrated in FIG. 1 (Step R1), and a predetermined action may be carried out (Step R2). The predetermined action may include that the distal end side link hub 15 of the link actuation device 1 moves through a defined path or may comprise a positioning action of the distal end side link hub 15 to a predetermined position. Once the completion of the predetermined action—for example, the completion of the movement at the terminating end of the defined path—or the completion of the positioning action is detected by the controller 50*a*, the torque of each of the motors 30*a* may be measured by means of the torque detector 53 (Step R3).

The determiner 54 may determine whether or not the torque of each of the motors 30*a* lies outside the predetermined range (Step R4). The notifier 56 may, if the torque of a defined number or more of the motors 30*a* lies outside the predetermined range, increment by 1 a count value of a counter (not shown) that counts the number of times in which torque abnormality has been detected (torque abnormality detection times) (Step R5) and may send a notification of torque abnormality to the notification content display 58 so that it can be displayed thereon (Step R6). This is because, at this point, the link actuation device 1 can still be deemed capable of normal operations. If, in step R4 for determination of the motor torque, the torque of a defined number or more of the motors lies within the predetermined range, no notification of torque abnormality may be sent (Step R7).

Figure 10:
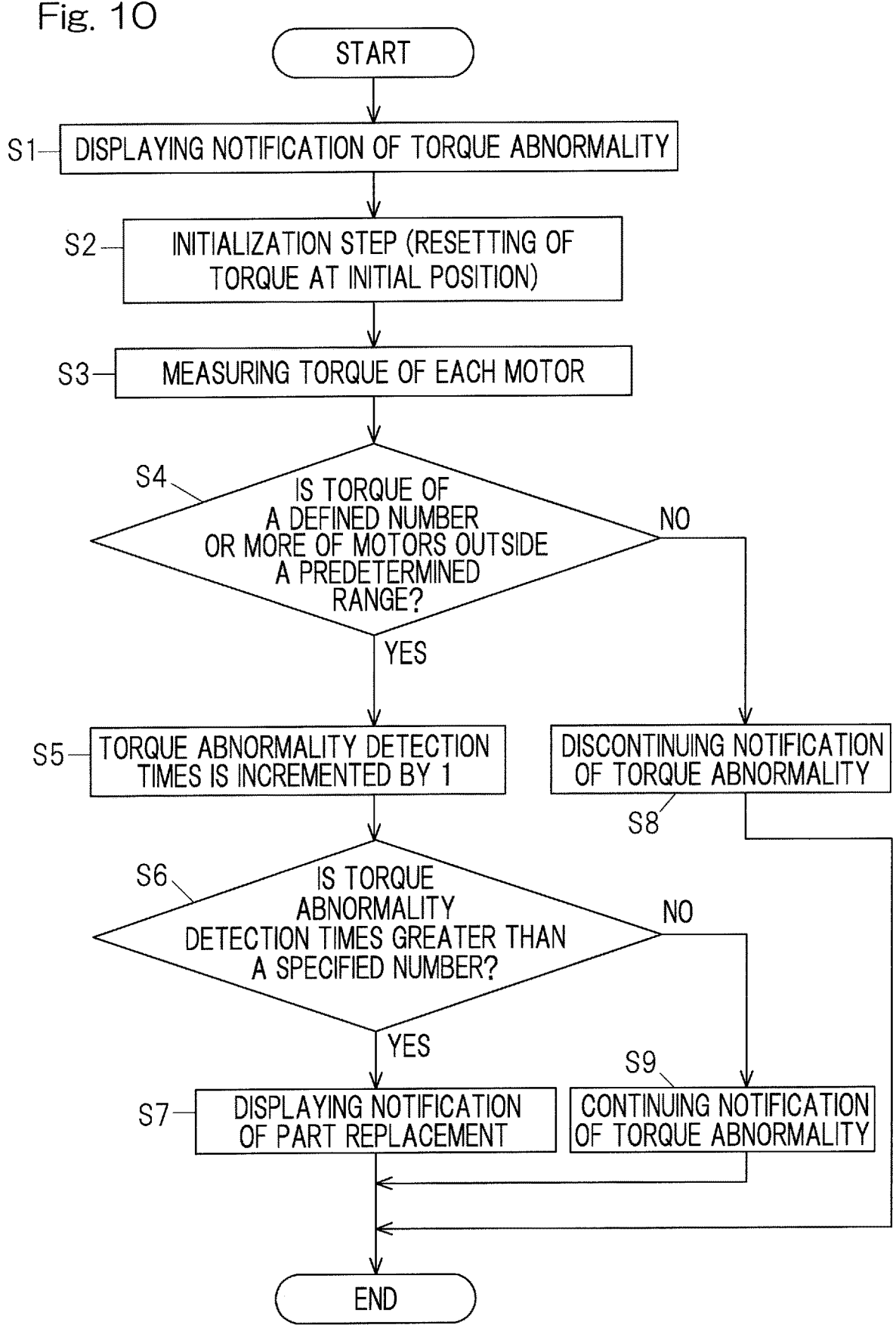
FIG. 10 shows a flow chart of an example of process steps after an initialization step, in the diagnostic device for the link actuation device.

FIG. 10 shows a flow chart that may be followed to send a notification that it is time to replace parts, as a function of the frequency of the aforementioned detection and with the aid of the memory 55 illustrated in FIG. 2. While the notification of torque abnormality is being displayed (Step S1), an initialization step may be performed (Step S2). The initialization step may involve resetting of a reference torque at an initial position of the link actuation device 1. The torque of each of the motors 30a may be measured (Step S3), and it may be determined whether or not the torque of a defined number or more of the motors 30a lies outside the predetermined range (Step S4). If it is determined that the torque of a defined number or more of the motors 30a lies within the predetermined range, the aforementioned notification of torque abnormality may be discontinued or may not be displayed (Step S8).

If it is determined that the torque of a defined number or more of the motors 30a lies outside the predetermined range, the count value of the counter (not shown) that counts the number of times in which torque abnormality has been detected (torque abnormality detection times) may be incremented by 1 (Step S5). It may be determined whether or not the incremented number of times of such torque abnormality detection is greater than a specified number (Step S6). If it has been determined to have not been greater than it, the notification of torque abnormality may continue to be displayed (Step S9). If, in step S6 for the aforementioned determination, it has been determined to have been greater than it, a notification that it is time to replace parts may be displayed on the notification content display 58 (Step S7).

With such a sequence of process steps, it can be determined whether or not it is time to replace parts (such as a gear or a bearing) composing the link actuation device 1, thus making it possible to appropriately generate a notification that promotes replacement of parts.

Figure 11:
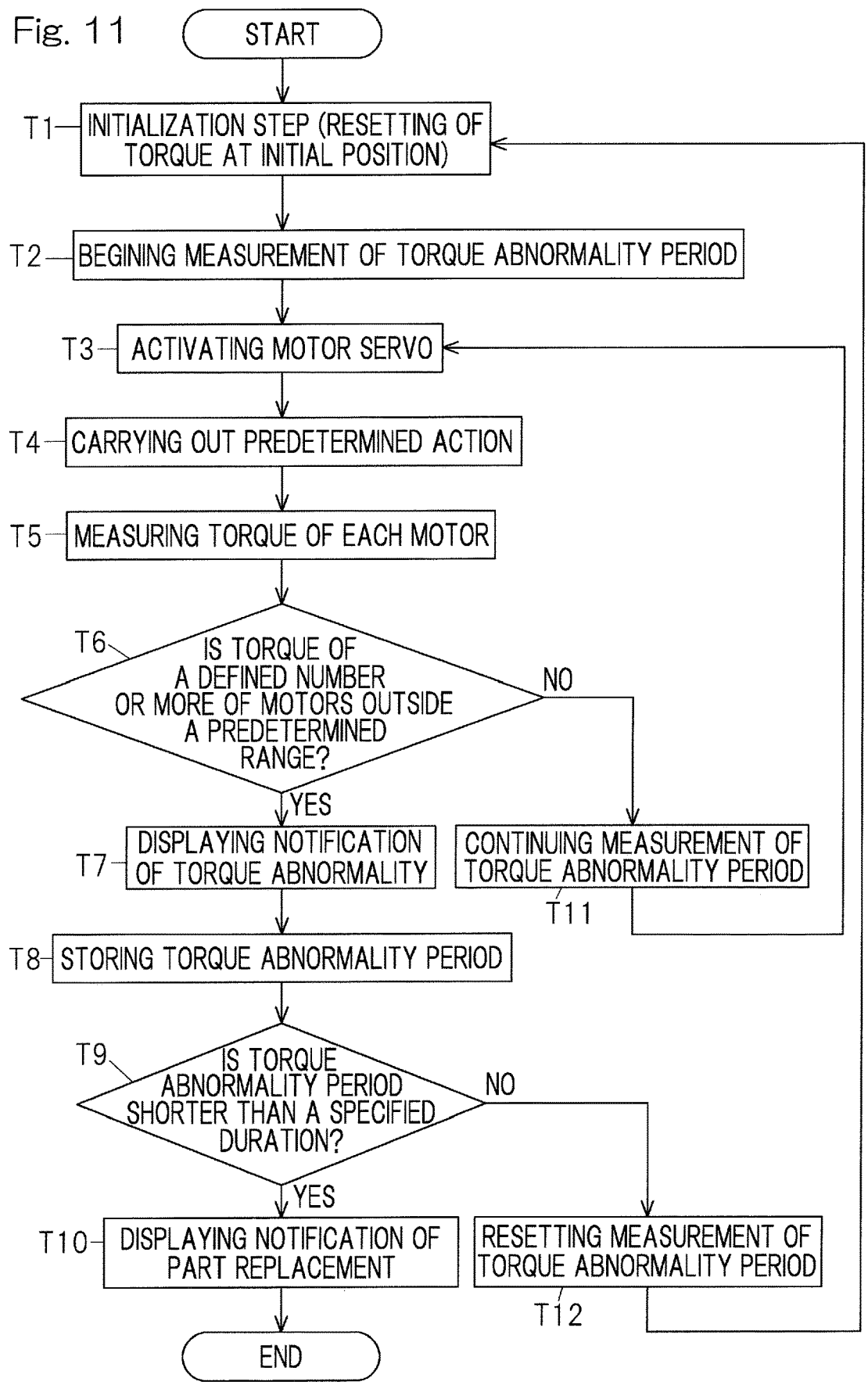
FIG. 11 shows a flow chart of another example of process steps after an initialization step, in the diagnostic device for the link actuation device.

FIG. 11 shows a flow chart that may be followed to determine whether or not to send a notification that it is time to replace parts, as a function of the duration of a period in which torque abnormality can be observed. Firstly, an initialization step (i.e., resetting of a reference torque at an initial position of the link actuation device 1) may be performed (Step T1). Then, the measurement of the duration of a period in which torque abnormality can be observed (that is, measurement of torque abnormality period) may begin (Step T2), and the motor servo of the controller 50a may be activated (Step T3). With the aid thereof, a predetermined action (e.g., a movement through a predetermined path or a positioning action) may be carried out (Step T4), and upon the completion of the predetermined action, the measurement of the torque of each of the motors 30a may be carried out (Step T5).

Figure 17:
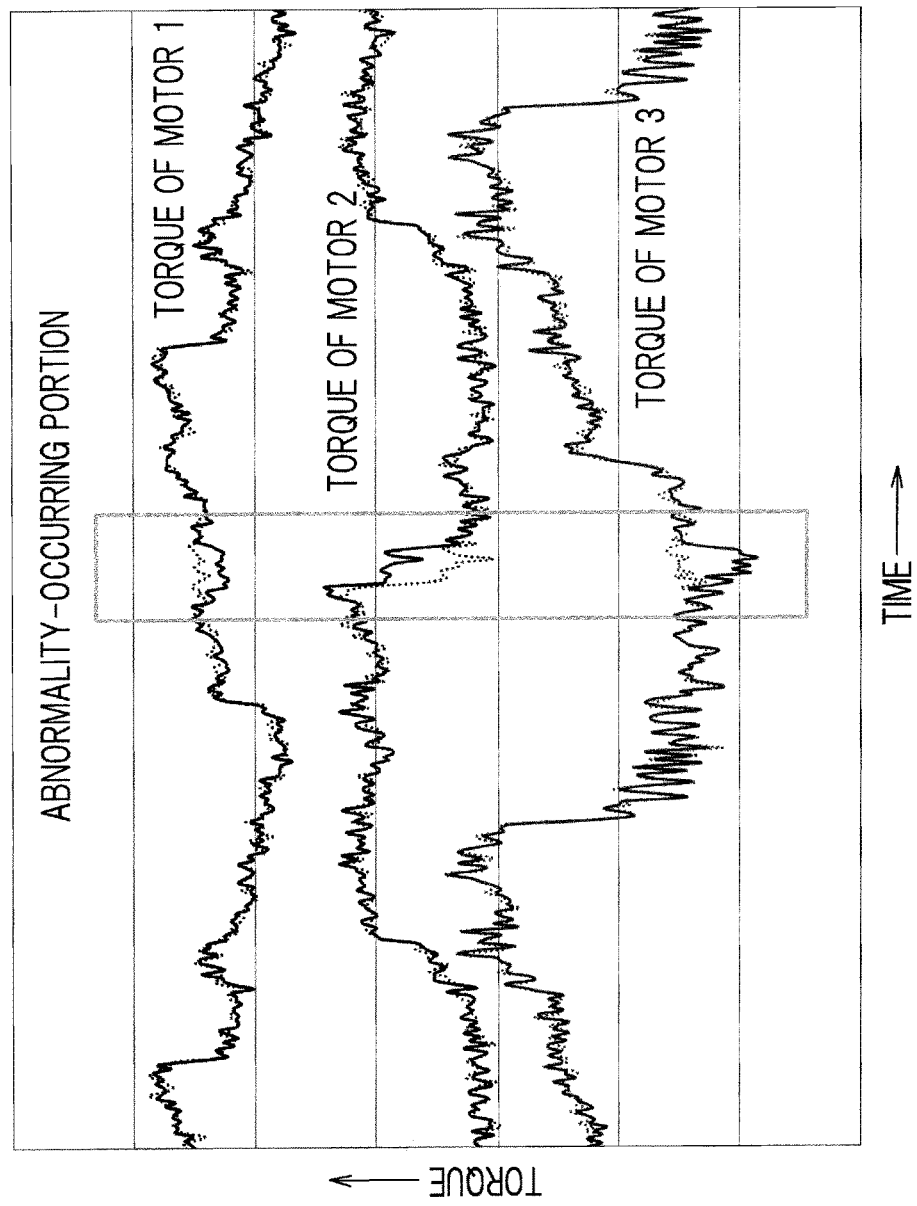
FIG. 17 is a chart illustrating motor torque variation for each axis, when the link actuation device contains an abnormality-occurring portion.

When there is any abnormality-occurring portion in the link actuation device 1, torque deviation from during-normal-operating-conditions torques is prone to occur along more than one axis at the same time, as shown in an example experiment of FIG. 17 illustrating torque variation along three axes. For this reason—out of all of the motors 30a—it may be determined whether or not the torque of a defined number or more of the motors 30a lies outside the predetermined range (Step T6). If the torque of a defined number or more of the motors 30a lies within the predetermined range, the measurement of the duration of a period in which torque abnormality can be observed may be continued (Step T11), and the process may return to Step T3 in which the motor servo may be activated.

It should be noted that FIG. 17 is a chart depicting an example of torque variation of the motors 30a (MOTOR 1 to MOTOR 3) when there is an abnormality-occurring portion, together with their during-normal-operating-conditions torque variation.

If it is determined that the torque of a defined number or more of the motors 30a lies outside the predetermined range, a notification of torque abnormality may be displayed (Step T7), and the duration of a period in which torque abnormality can be observed (torque abnormality period) may be stored (Step T8). Thereafter, it may subsequently be determined whether or not the duration of a period in which torque abnormality can be observed (torque abnormality period) is shorter than a specified duration (Step T9). The specified duration may be set in advance to a value that is defined appropriately in accordance with the design. If it is equal to or longer than the certain defined duration, the measurement of the duration of a period in which torque abnormality can be observed (torque abnormality period) may be reset (Step T12), and the process may return to the step T1 in which the initialization step may be performed. If it is shorter than the specified duration, a notification that it is time to replace parts may be displayed (Step T10).

By carrying out those process steps that are illustrated in FIG. 10 or FIG. 11, it is possible to inform a user with excellent reliability that it is time to replace parts before the breakage of, for example, a gear or a gear-like part occurs. Therefore, replacement of parts can be performed before the device is rendered inoperable, thus achieving further improved maintainability of the link actuation device 1.

A particular example of construction of the link actuation device 1 will be described. The link actuation device 1 may include a linkage mechanism 3, via which a distal end mounting member 4 (FIG. 4) to which, for example, a medical instrument can be mounted may be coupled to the pedestal 2 in such a way that posture of the distal end mounting member 4 can be changed. The linkage mechanism 3 may include: a proximal end side link hub 14 that can be fixedly mounted to the pedestal 2 via a spacer 5; a distal end side link hub 15 that can be fixedly mounted to the distal end mounting member 4; and three link mechanisms 11, 12 and 13 (that may hereinafter be labeled with "11 to 13") via which the proximal end side link hub 14 and the distal end side link hub 15 are coupled to each other. It should be emphasized that, in FIG. 4, only a single link mechanism 11 is visible.

Figure 6:
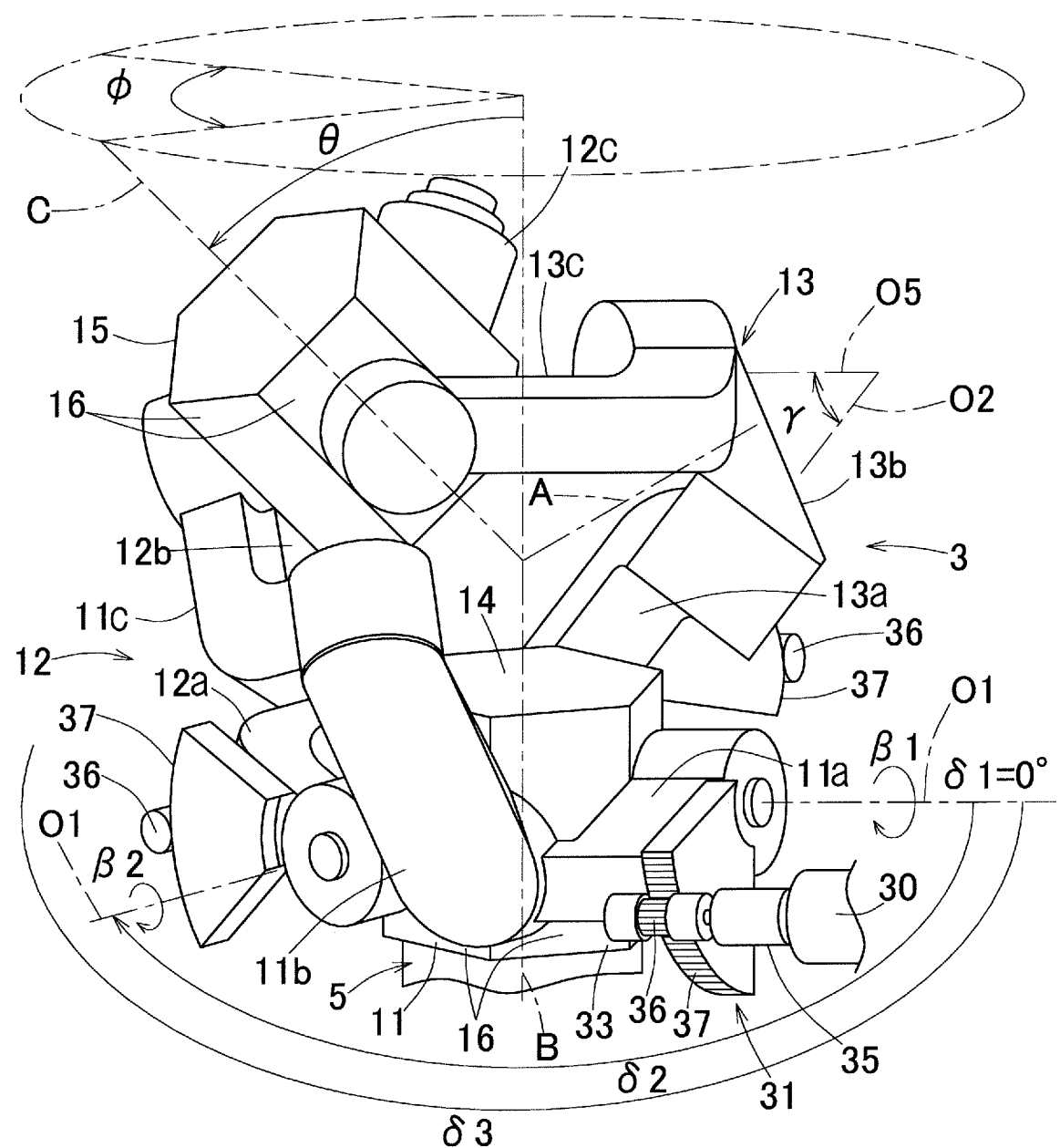
FIG. 6 shows a perspective view of a linkage mechanism of the link actuation device.

FIG. 6 shows a perspective view of the linkage mechanism 3 of the link actuation device 1. Each of the link mechanisms 11, 12 and 13 composing the linkage mechanism 3 may include: a proximal side end link member 11a, 12a or 13a (that may hereinafter be labeled with "11a to 13a"); an intermediate link member 11b, 12b or 13b (that may hereinafter be labeled with "11b to 13b"); and a distal side end link member 11c, 12c or 13c (that may hereinafter be labeled with "11c to 13c"), thereby forming a three-link chain linkage mechanism with four revolute pairs. The proximal side end link member 11a to 13a may be L-shaped and may be pivotably coupled at a base end thereof to the proximal end side link hub 14. The distal side end link member 11c to 13c may be L-shaped and may be pivotably coupled at a base end thereof to the distal end side link hub 15. The intermediate link member 11b to 13b may have opposite ends that are pivotably coupled to a free end (tip end) of the proximal side end link member 11a to 13a and a free end (tip end) of the distal side end link member 11c to 13c, respectively.

Each of the proximal side end link member 11a to 13a and the distal side end link member 11c to 13c may be designed to have a spherical link structure. Respective spherical link centers PA and PC (FIG. 4 and FIG. 5) defined by respective three link mechanisms 11 to 13 can coincide with each other, and respective distances defined by the respective three link mechanisms 11 to 13 with respect to the spherical link centers PA and PC can also coincide with each other. The axes of the revolute pairs serving as connections between the end link member 11a to 13a and the intermediate link member 11b to 13b and between the end link member 11c to 13c and the intermediate link member 11b to 13b may intersect with each other at a certain intersection angle or may extend parallel to each other.

Figure 7:
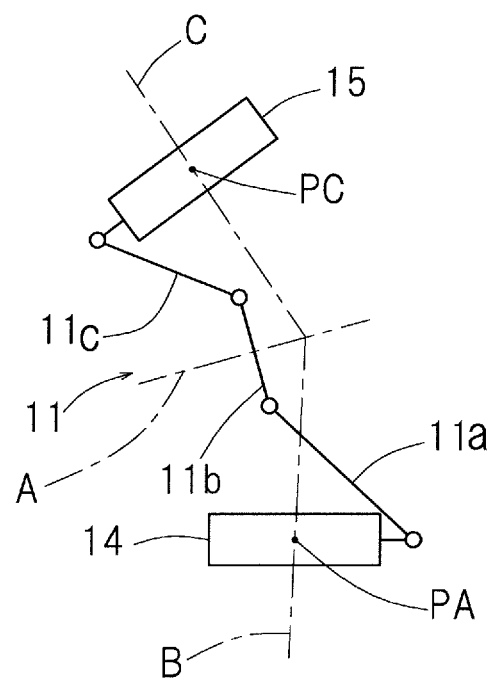
FIG. 7 shows a schematic view of one of the link mechanisms of the link actuation device.

Thus, the three link mechanisms 11 to 13 can have geometrically identical shapes. Having geometrically identical shapes means that the respective link mechanisms 11 to 13, when the link members 11a to 13a, 11b to 13b and 11c to 13c thereof are converted into respective geometrical models defined by straight lines, cooperate to form such a shape that a proximal end side segment thereof and a distal end side segment thereof are symmetric to each other with respect to a mid-point of intermediate link members 11b to 13b. FIG. 7 schematically shows one of the link mechanisms 11, which is depicted with straight lines.

Figure 4:
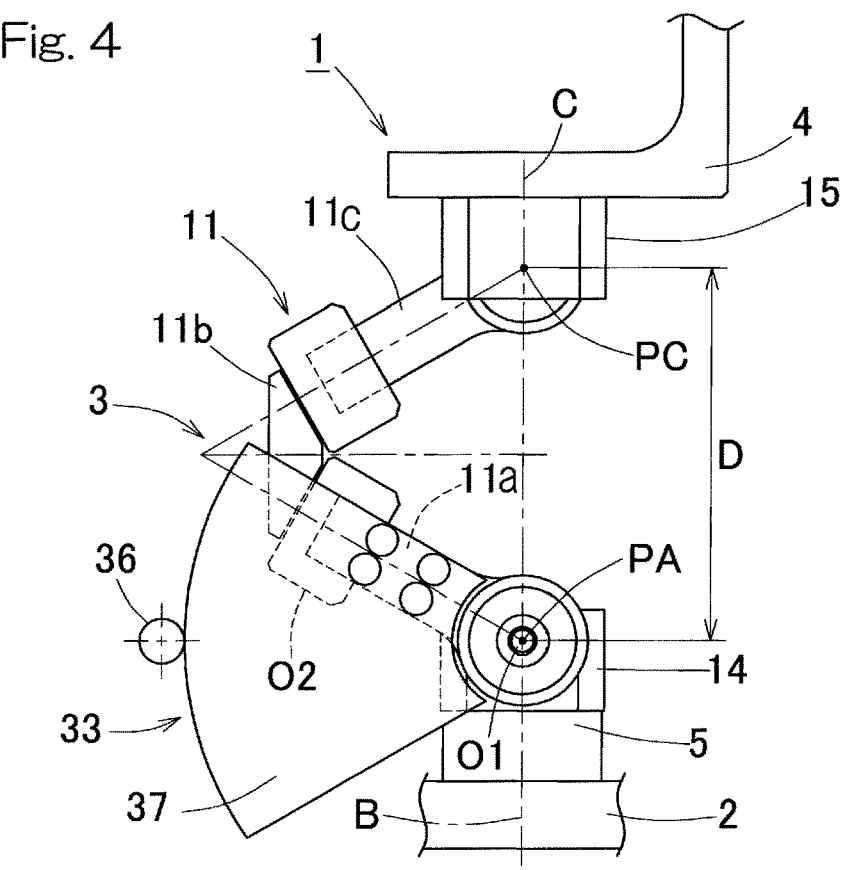
FIG. 4 shows a front elevational view of the link actuation device, illustrating only one of link mechanisms thereof.
Figure 5:
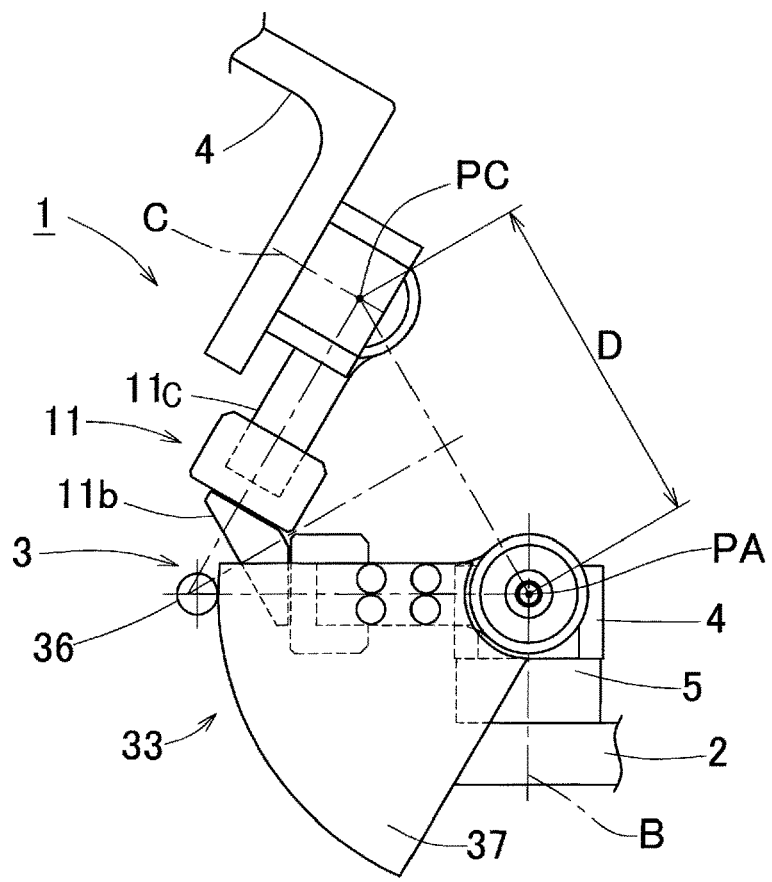
FIG. 5 shows a front elevational view of the link actuation device, in an operating condition that is different from that in FIG. 4.

Each of the link mechanisms 11 to 13 in the embodiment under discussion may be of a rotationally symmetric design, in which the positional relationship between a combination of the proximal end side link hub 14 and the proximal side end link member 11a to 13a, on one hand, and a combination of the distal end side link hub 15 and the distal side end link member 11c to 13c, on the other hand, is such that the former and the latter are rotationally symmetric to each other with respect to a middle axis A (FIG. 6) of the intermediate link member 11b to 13b. FIG. 4 illustrates a condition in which a central axis B of the proximal end side link hub 14 and a central axis C of the distal end side link hub 15 are colinear, while FIG. 5 illustrates a condition in which the central axis C of the distal end side link hub 15 has taken a predetermined operating angle with respect to the central axis B of the proximal end side link hub 14. The distance D between the proximal end side spherical link center PA and the distal end side spherical link center PC can remain unchanged even as the posture of each of the link mechanisms 11 to 13 changes.

Each of the proximal end side link hub 14 and the distal end side link hub 15 may be hexagonal prism-shaped and may have six side faces 16 (FIG. 6) that form an outer peripheral surface thereof. Via three of the side faces 16 that are spaced apart from one another by one side face, the proximal side end link members 11a to 13a and distal side end link members 11c to 13c may be pivotably coupled to the proximal end side link hub 14 and the distal end side link hub 15, respectively.

Figure 8:
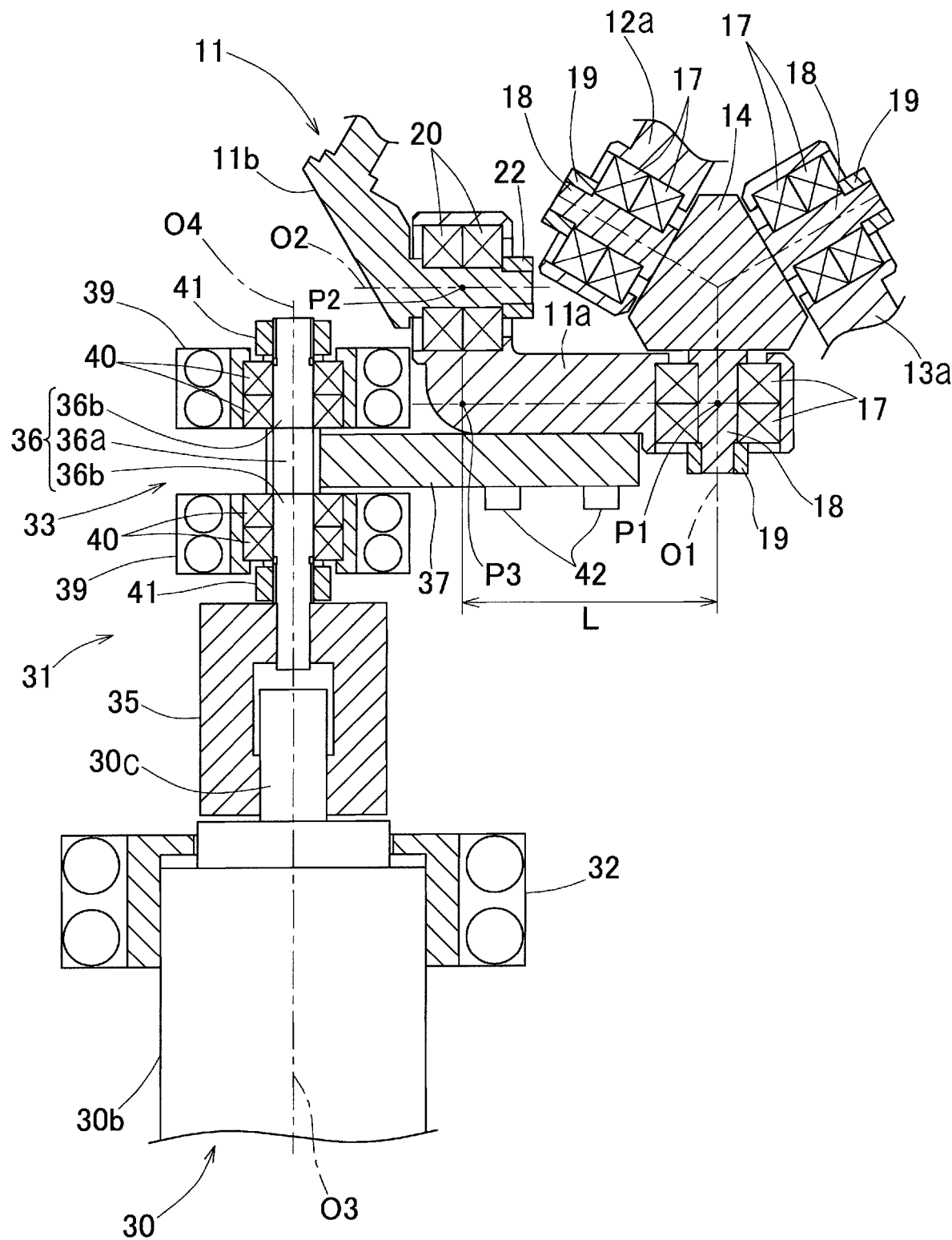
FIG. 8 shows a fragmentary cross sectional view of the link actuation device, on an enlarged scale.

FIG. 1 contains, in a lower part of the figure, a horizontal cross sectional view illustrating connections between the proximal end side link hub 14 and the proximal side end link members 11a to 13a. FIG. 8 illustrates a fragmentary cross section of FIG. 1. From the side surface 16 (FIG. 6) of the proximal end side link hub 14, shaft portions 18 (FIG. 8) may protrude. Inner rings (not shown) of bearings 17 in double-row arrangement (FIG. 6) may be fittedly mounted on each of the shaft portions 18, and outer rings (not shown) of the bearings 17 may be fittedly mounted into one end of the opposite ends—i.e., an end that faces the proximal end side link hub 14—of a respective one of the proximal side end link members 11a to 13a. Thus, the inner rings can be secured to the proximal end side link hub 14, and the outer rings can rotate together with the respective one of the proximal side end link members 11a to 13a. The bearings 17 may, for example, comprise a ball bearing such as a deep groove ball bearing or an angular contact ball bearing and may be secured in place by tightening of a nut 19 with a predetermined amount of preload applied thereto. Instead of the use of ball bearings in double-row arrangement such as in the illustrated example, the bearings 17 may comprise a roller bearing or a plain bearing. Analogous designs can be applied to the connections between the distal end side link hub 15 and the distal side end link members 11c to 13c.

Also, in the connections between the proximal side end link members 11a to 13a and the intermediate link members 11b to 13b, pivotal mutual coupling via bearings 20 in double-row arrangement may be realized. That it, outer rings (not shown) of the bearings 20 may be fittedly mounted into the respective one of the proximal side end link members 11a to 13a, and inner rings (not shown) of the bearings 20 may be fittedly mounted onto a shaft portion 21 that can be associated with a respective one of the intermediate link members 11b to 13b. It should be emphasized that, in FIG. 1 and FIG. 8, only the connection between one of the proximal side end link members 11a and a respective one of the intermediate link members 11b is visible. The bearings 20 may, for example, comprise a ball bearing such as a deep groove ball bearing or an angular contact ball bearing and may be secured in place by tightening of a nut 22 with a predetermined amount of preload applied thereto. Instead of the use of ball bearings in double-row arrangement such as in the illustrated example, the bearings 20 may comprise a roller bearing or a plain bearing. Analogous designs can be applied to the connections between the distal side end link members 11c to 13c and the intermediate link members 11b to 13b.

The link mechanisms 11 to 13 that are illustrated in FIG. 6 may be designed such that the angles and lengths of the shaft portions 18 (FIG. 8) of the proximal end side link hub 14 are identical to those of the shaft portions 18 of the distal end side link hub 15, and the geometrical shapes of those end link members 11a to 13a adjacent to the proximal end side link hub 14 are identical to the geometrical shapes of those end link members 11c to 13c adjacent to the distal end side link hub 15, and furthermore in the intermediate link members 11b to 13b the shape of the proximal end side link hub 14 and the shape of the distal end side link hub 15 are identical. In such configuration, when the angular positional relationship between the intermediate link members 11b to 13b and those end link members 11a to 13a coupled to the proximal end side link hub 14 is the same as the angular positional relationship between the intermediate link members 11b to 13b and those end link members 11c to 13c coupled to the distal end side link hub 15, a combination of the proximal end side link hub 14 and the proximal side end link members 11a to 13a can make an identical motion to that of a combination of the distal end side link hub 15 and the distal side end link members 11c to 13c, as a consequence of the resulting geometrical symmetry. For example, when transmission of rotation from the proximal end side link hub 14 to the distal end side link hub 15 is performed by defining, in the proximal end side and the distal end side link hubs 14 and 15, respective rotational axes that are coaxial with the central axes B and C thereof, the proximal end side link hub 14 and the distal end side link hub 15 rotate through identical angles at a constant velocity, thereby forming a constant velocity universal joint. A plane of symmetry of each of the intermediate link members 11b to 13b—when such a constant speed rotation is possible—may be referred to as a constant velocity bisecting plane.

Therefore, by arranging a plurality of link mechanisms 11 to 13 that have geometrically identical shapes along a common circumference and by configuring the link mechanisms 11 to 13 to share the same proximal end side link hub 14 and the same distal end side link hub 15, the plurality of the link mechanisms 11 to 13 can be moved coherently only when the intermediate link members 11b to 13b are each positioned on the constant velocity bisecting plane. In this way, a constant velocity rotation is possible regardless of the operating angle that is taken by the distal end side link hub 15 with respect to the proximal end side link hub 14.

By using a bearing structure to construct rotational zones in the four revolute pairs in each of the link mechanisms 11 to 13—that is, the connection between the proximal end side link hub 14 and a respective one of the proximal side end link members 11a to 13a, the connection between the distal end side link hub 15 and a respective one of the distal side end link members 11c to 13c, the connection between the respective one of the proximal side end link member 11a to 13a and a respective one of the intermediate link members 11b to 13b, and the connection between the respective one of the distal side end link members 11c to 13c and the respective one of the intermediate link members 11b to 13b—it is possible to reduce frictional resistance at the connections to achieve smaller rotational resistance therein, thus ensuring a smoother power transmission while at the same time improving the durability thereof.

By designing the linkage mechanism 3 in this manner, the movable range of distal end side link hub 15 relative to the proximal end side link hub 14 can be increased. For example, a maximum value of the bending angle θ (i.e., a maximum bending angle) between the central axis C of the distal end side link hub 15 and the central axis B (FIG. 6) of the proximal end side link hub 14 can reach as much as approximately ±90°. Also, the turning angle φ of the distal end side link hub 15 relative to the proximal end side link hub 14 can range from 0° to 360°. The bending angle θ is meant to indicate an angle at which the central axis C of the distal end side link hub 15 is inclined with respect to the central axis B of the proximal end side link hub 14—when viewed on a vertical plane. The turning angle φ is meant to indicate an angle at which the central axis C of the distal end side link hub 15 is inclined with respect to the central axis B of the proximal end side link hub 14—when viewed on a horizontal plane.

Each of the three link mechanisms 11 to 13 may be provided with a respective one of the actuators 30 and a respective one of the speed reducer mechanisms 31. Although reference will only be made to an actuator 30 and a speed reducer mechanism 31 that are associated with one of the link mechanisms 11 in connection with FIG. 1 and FIG. 8, the same description can also apply to those associated with the other link mechanisms 12 and 13.

As shown in FIG. 1, the actuators 30 may comprise a rotary actuator—in particular, a servo motor 30a that is equipped with a speed reducer 30b—and may be fixedly mounted to the pedestal 2 via the motor fixation members 32. The speed reducer mechanisms 31 may each be formed of the speed reducer 30b of a respective one of the actuators 30 and a gearing speed reducer 33.

As shown in FIG. 8, the gearing speed reducer 33 may include a smaller gear 36 that is rotatably coupled to an output shaft 30c of the respective one of the actuators 30 via a coupling 35, and a larger gear 37 that is secured to a respective one of the proximal side end link members 11a so as to meshingly engage the smaller gear 36. In the illustrated example, both of the smaller gear 36 and the larger gear 37 may be spur gears, and in particular, the larger gear 37 is in the form of a sector gear having a sector-shaped peripheral surface that is formed thereon with teeth. The larger gear 37 may have a pitch radius that is shorter than that of the smaller gear 36, and thus, rotation of the output shaft 30c of the respective one of the actuators 30 can be transmitted to the respective one of the proximal side end link members 11a by being turned into rotation about an axis O1 of the revolute pair between the proximal end side link hub 14 and the respective one of the proximal side end link members 11a with a speed being reduced with respect to that of the rotation of the output shaft 30c. The reduction ratio may be equal to or greater than 10.

The pitch radius of the larger gear 37 may be equal to or greater than a ½ of the arm length L of the respective one of the proximal side end link members 11a. The arm length L may be defined as a distance from an axial central point P1 of the axis O1 of the revolute pair between the proximal end side link hub 14 and the respective one of the proximal side end link members 11a to a point P3. The point P3 is generated by projecting an axial central point P2 of an axis O2 of the revolute pair between the respective one of the proximal side end link members 11a and a respective one of the intermediate link members 11b, onto a plane that extends perpendicular to the axis O1 of the revolute pair between the proximal end side link hub 14 and the respective one of the proximal side end link members 11a and that passes through the axial central point P1 thereof, on the other hand. In the case of the embodiment under discussion, the pitch radius of the larger gear 37 is designed to be equal to or greater than the arm length L. This may be advantageous in order to obtain a high reduction ratio.

The smaller gear 36 may include: a toothed portion 36a that meshingly engages the larger gear 37; and shaft portions 36b projecting from the toothed portion 36a at opposite sides of the toothed portion 36a. The shaft portions 36b may each be rotatably supported by means of bearings 40 in double-row arrangement, which bearings 40 may be arranged in a rotation support member 39 that is installed on the pedestal 2. The bearings 40 may for example comprise a ball bearing such as a deep groove ball bearing or an angular contact ball bearing. Instead of the use of ball bearings in double-row arrangement such as in the illustrated example, the bearings 40 may comprise a roller bearing or a plain bearing. A shim (not shown) may be arranged between outer rings (not shown) of the bearings 40 in double-row arrangement, and a nut 41 screwed on a respective one of the shaft portions 36b may be tightened to apply a preload to the bearings 40. The outer rings of the bearings 40 may be press-fitted into the rotation support member 39.

The larger gear 37 may be a component separate from the respective one of the proximal side end link members 11a and may be removably attached to the respective one of the proximal side end link members 11a by means of connection elements 42 such as bolts.

An axis O3 of rotation of the respective one of the actuators 30 and an axis O4 of rotation of the smaller gear 36 may be coaxial with each other. These axes O3 and O4 of rotation may extend parallel to the axis O1 of the revolute pair between the proximal end side link hub 14 and the respective one of the proximal side end link members 11a and may also be at the same height from the pedestal 2 as the axis O1.

Referring back to FIG. 1, the control unit 50 may be of computerized numerical control type, and the controller 50a in the control unit 50 may define the posture of the distal end side link hub 15 by selecting, for example, the bending angle θ (FIG. 6) and the turning angle φ (FIG. 6). Also, respective pivoting angles βn (β1 and β2 in FIG. 6) of the proximal side end link members 11a to 13a may be detected by means of, for example, an encoder (not shown). Alternatively, an encoder (not shown) that may be assigned to each of the actuators 30 may be used for detection of the posture of the distal end side link hub 15. There is a correlation between the bending angle θ and the turning angle φ, on one hand, and the respective pivoting angles βn, on the other hand, so one of the former and the latter can be derived from the other.

To change the posture of the distal end side link hub 15 relative to the proximal end side link hub 14, control target values for the pivoting angles βn of the proximal side end link members 11a to 13a may be calculated, according to what is defined by the controller 50a as the posture of the distal end side link hub 15 (or a coordinate position thereof). The pivoting angles βn may represent the operating positions of the actuators 30. The pivoting angles βn may be calculated using an inverse transformation of the Equation 1 described below. The inverse transformation can involve a transformation for calculating the pivoting angles βn of the proximal side end link members 11a to 13a from the bending angle θ and the turning angle φ.

$$\cos(\theta/2)\sin \beta n - \sin(\theta/2)\sin(\varphi + \delta n)\cos \beta n + \sin(\gamma/2) = 0 \quad \text{(Equation 1)}$$

In the equation, γ (FIG. 6) indicates an angle defined between the axis O2 of the revolute pair between one of the proximal side end link members 11a to 13a and a respective one of the intermediate link members 11b to 13b, on one hand, and an axis O5 of the revolute pair between a respective one of the distal side end link members 11c to 13c and the respective one of the intermediate link members 11b to 13b, on the other hand. δn (δ1, δ2 and δ3 in FIG. 6) indicates a circumferential angle of separation of each of the proximal side end link members 11a to 13a with respect to one of the proximal side end link members 11a that is selected as a reference.

Once the control target values for the pivoting angles βn are calculated, the output of each of the actuators 30 may be controlled by means of feedback control using a signal from a posture detector (not shown), so that the actual pivoting angles βn can reach the control target values. In this way, the proximal side end link members 11a to 13a of all of the link mechanisms 11 to 13 can be caused to pivotingly rotate through selected pivoting angles βn to change the posture of the distal end side link hub 15.

Figure 12:
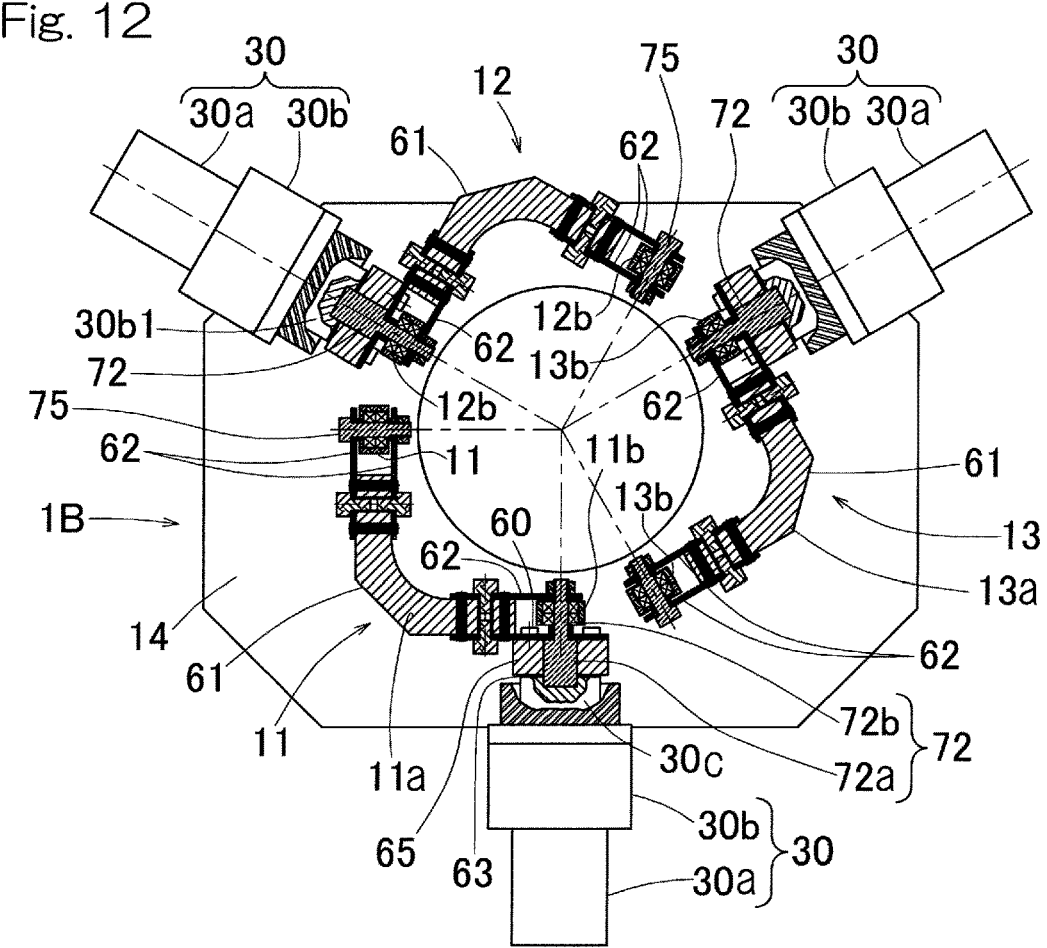
FIG. 12 shows a horizontal cross sectional view of another example of the link actuation device that can be placed under control of the diagnostic device.
Figure 13:
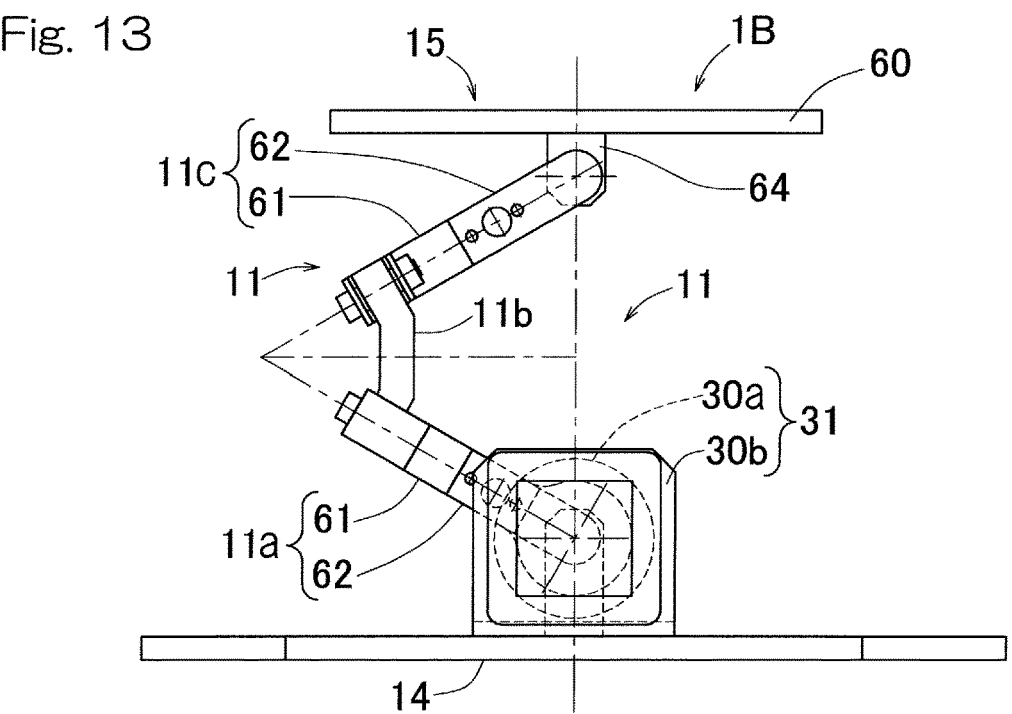
FIG. 13 shows a front elevational view of one of the link mechanisms of the link actuation device.
Figure 14:
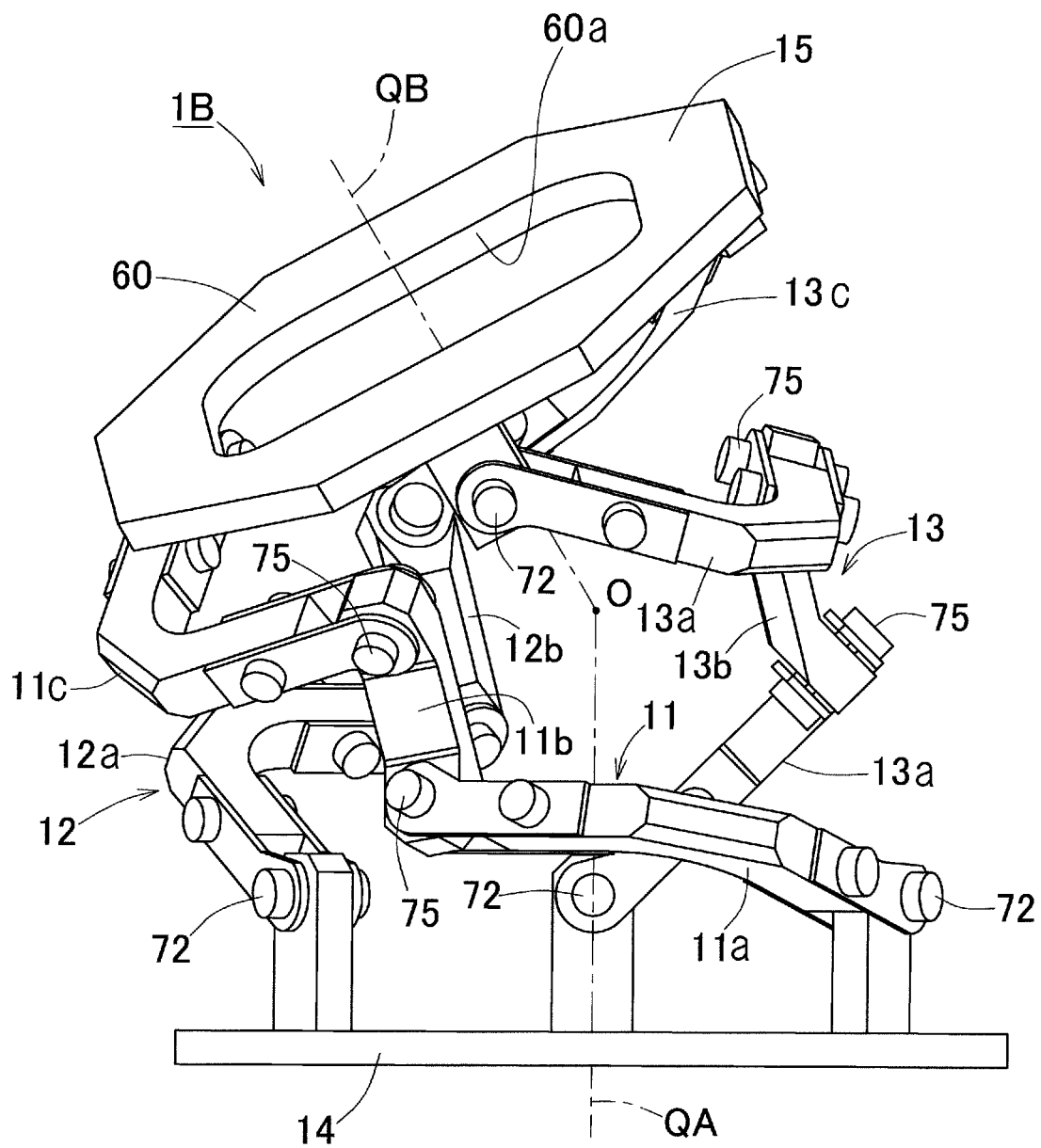
FIG. 14 shows a perspective view of the link actuation device.

FIG. 12 to FIG. 14 show another particular example of the parallel link mechanism 1A (FIG. 1) which can be the one on which the diagnosis by the diagnostic device 51 is based. The basic features of the parallel link mechanism 1B shown therein are identical to those of the parallel link mechanism 1A which is already discussed in connection with FIG. 1 to FIG. 8. That is, the distal end side link hub 15 may be coupled to the proximal end side link hub 14 via three or more link mechanisms 11 to 13 such that posture of the distal end side link hub 15 can be changed. Electric actuators 30 may be provided that cooperate to arbitrarily change the distal end posture, which is defined as posture of the distal end side link hub 15, relative to the proximal end side link hub 14, with each of the three or more link mechanisms 11 to 13 being associated with a respective one of the electric actuators 30. Each of the link mechanisms 11 to 13 may include: a proximal side end link member 11a, 12a or 13a having opposite ends, with one end of the opposite ends being pivotably coupled to the proximal end side link hub 14; a distal side end link member 11c, 12c or 13c having opposite ends, with one end of the opposite ends being pivotably coupled to the distal end side link hub 15; and an intermediate link member 11b, 12b or 13b having opposite ends that are pivotably coupled to the other end of the opposite ends of the proximal side end link member 11a, 12a or 13a and the other end of the opposite ends of the distal side end link member 11c, 12c or 13c, respectively. Furthermore, the link mechanisms 11, 12 and 13, when converted into respective geometrical models defined by straight lines, may cooperate to form such a shape that a proximal end side segment thereof and a distal end side segment thereof are symmetric to each other with respect to a mid-point of intermediate link members 11b, 12b and 13b.

It should be understood that those features other than those which will be discussed below are the same as those of the parallel link mechanism 1A that are already mentioned in connection with FIG. 1 to FIG. 8.

Referring to FIG. 14, the distal end side link hub 15 may include: a flat plate-shaped distal end member 60 having a center that is formed therein with a circular through bore 60a; and three pivot shaft connection members 64 that are disposed around the through bore 60a formed in the distal end member 60 and that are circumferentially spaced apart uniform distances from one another. The center of the through bore 60a may be located on a central axis QB of the distal end side link hub 15. Pivot shafts 72, each of which has an axis that intersects with the central axis QB of the link hub, may each be pivotably coupled to a respective one of the pivot shaft connection elements 64. A respective one of the distal side end link members 11c, 12c and 13c may be connected at one end of the opposite ends thereof to a respective one of the pivot shafts 72 of the link hub 15. The respective one of the distal side end link members 11c, 12c and 13c may be connected at the other end of the opposite ends thereof to a respective one of pivot shafts 75. The respective one of pivot shafts 75 may be pivotably coupled to one end of the opposite ends of a respective one of the intermediate link members 11b. The respective one of the pivot shafts 72 of the link hub 15 and the respective one of the pivot shafts 75 of the respective one of the intermediate link members 11b may be pivotably coupled—each via two bearings (not shown)—to the respective one of the pivot shaft connection elements 64 and the one end of the opposite ends of the respective one of the intermediate link members 11b, 12b and 13b, respectively.

Now the construction of the end link members 11a, 12a, 13a and 11c, 12c and 13c will be described in connection with FIG. 12 to FIG. 14. As the proximal side end link members 11a, 12a and 13a and the distal side end link members 11c, 12c and 13c are of identical designs, reference will only be made—by way of example—to one of the proximal side end link members 11a. Referring to FIG. 12, the one end link member 11a in the parallel link mechanism 1B may include a single curvilinear member 61 and a total of four pivot shaft support members 62 that are fixed to the curvilinear member 61 at opposite ends of the curvilinear member 61 on radially outer side faces as well as radially inner side faces thereof, respectively. The four pivot shaft support members 62 may have identical shapes.

The pivot shaft 75 may be supported at one end of the opposite ends of the one end link member 11a by means of two of the pivot shaft support members 62, and a respective one of the intermediate link members 11b may be pivotably connected to the pivot shaft 75. The pivot shaft 72 may be supported at the other end of the opposite ends of the one end link member 11a by means of the other two of the pivot shaft support members 62, and the proximal end side link hub 14 may be pivotably connected to the pivot shaft 72. In each of these pivotal connections, bearing(s) such as rolling contact bearing(s) may be arranged in interposed fashion.

Similarly to the preceding embodiments, each of the posture control actuators 30 may include a motor 30a and a speed reducer 30b. An output shaft 30c of the speed reducer 30b may have a planar flange surface 63 that extends perpendicular to a central axis of the output shaft 30c. The output shaft 30c may be coupled at the flange surface thereof, via a spacer 65, to one of the pivot shaft support members 62 by means of a bolt, with the one of the pivot shaft support members 62 being located on a radially outer side of the aforementioned one proximal side end link member 11a.

Figure 15:
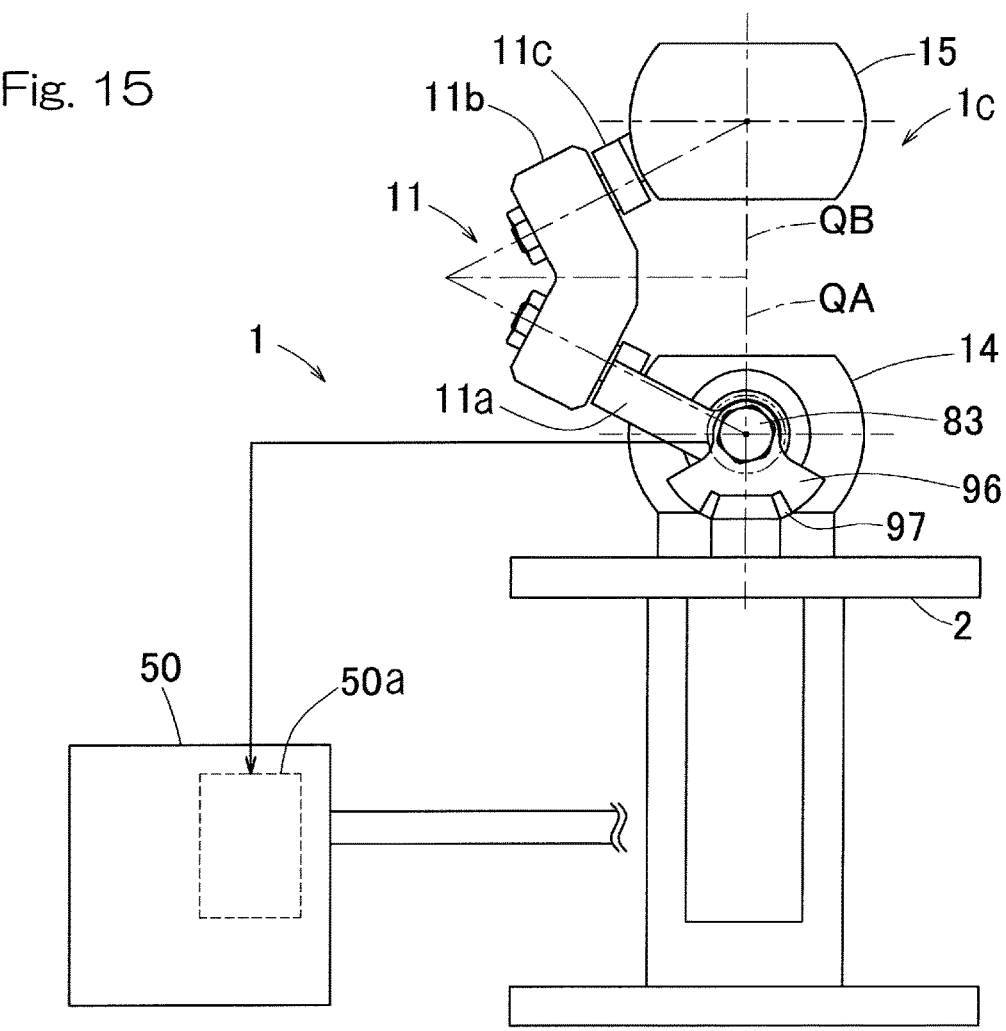
FIG. 15 shows a horizontal cross sectional view of yet another example of a parallel link mechanism that can be placed under control of the diagnostic device.
Figure 16:
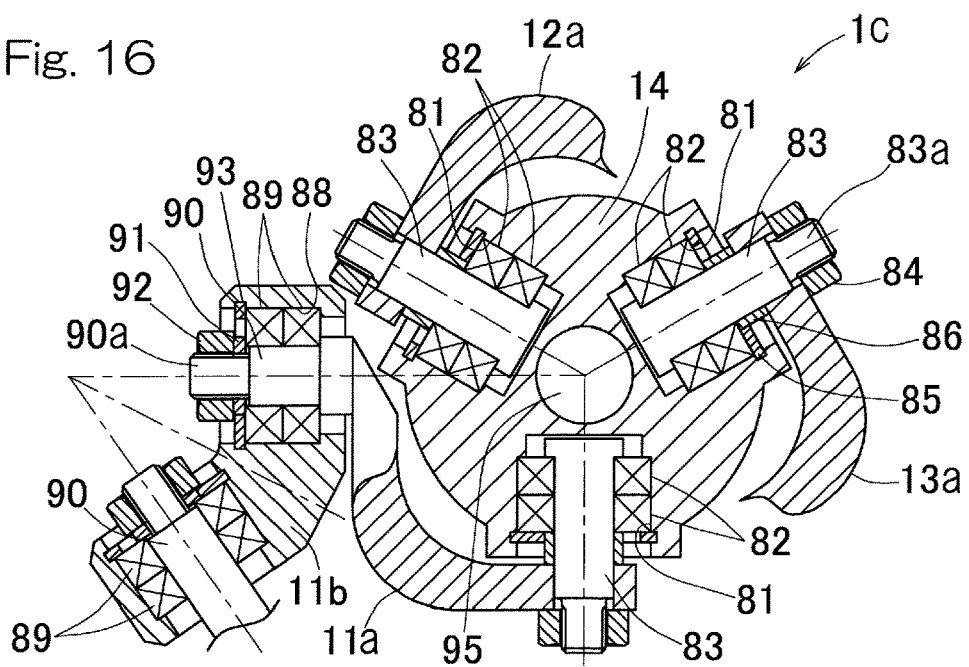
FIG. 16 shows a fragmentary horizontal cross sectional view of the parallel link mechanism on an enlarged scale.

FIG. 15 and FIG. 16 show yet another particular example of the parallel link mechanism 1A (FIG. 1) which can be the one on which the diagnosis by the diagnostic device 51 is based. The basic features of the parallel link mechanism 1C shown therein are identical to those of the parallel link mechanism 1A which is already discussed in connection with FIG. 1 to FIG. 8. That is, the distal end side link hub 15 may be coupled to the proximal end side link hub 14 via three or more link mechanisms 11 to 13 such that posture of the distal end side link hub 15 can be changed. Electric actuators 30 may be provided that cooperate to arbitrarily change the distal end posture, which is defined as posture of the distal end side link hub 15, relative to the proximal end side link hub 14, with each of the three or more link mechanisms 11 to 13 being associated with a respective one of the electric actuators 30. Each of the link mechanisms 11 to 13 may include: a proximal side end link member 11a, 12a or 13a having opposite ends, with one end of the opposite ends being pivotably coupled to the proximal end side link hub 14; a distal side end link member 11c, 12c or 13c having opposite ends, with one end of the opposite ends being pivotably coupled to the distal end side link hub 15; and an intermediate link member 11b, 12b or 13b having opposite ends that are pivotably coupled to the other end of the opposite ends of the proximal side end link member 11a, 12a or 13a and the other end of the opposite ends of the distal side end link member 11c, 12c or 13c, respectively. Furthermore, the link mechanisms 11, 12 and 13, when converted into respective geometrical models defined by straight lines, may cooperate to form such a shape that a proximal end side segment thereof and a distal end side segment thereof are symmetric to each other with respect to a mid-point of intermediate link members 11b, 12b and 13b. It should be understood that those features other than those which will be discussed below are the same as those of the parallel link mechanism 1A that are already mentioned in connection with FIG. 1 to FIG. 8.

FIG. 16 shows a cross sectional view illustrating the revolute pairs between the proximal end side link hub 14 and proximal side end link members 11a, 12a and 13a, as well as one of the revolute pairs between the proximal side end link members 11a, 12a and 13a and intermediate link members 11b, 12b and 13b. The proximal end side link hub 14 may have a through bore 95 that extends in the aforementioned axial direction and may also have radial communicating bores 81 which can communicate with an outer periphery of the proximal end side link hub 14, with the radial communicating bores 81 being formed in the proximal end side link hub 14 at three circumferential locations thereof. Each of shaft members 83 may be rotatably supported via two bearings 82 that are arranged in a respective one of the communicating bores 81. An outer end portion of each of the shaft members 83 may radially protrude from the proximal end side link hub 14 to provide a threaded portion 83a, and a respective one of the proximal side end link members 11a may be coupled to the threaded portion 83a and may be secured in place by tightening of a nut 84.

The bearings 82 may for example comprise a rolling contact bearing such as a deep groove ball bearing. Outer rings (not shown) of the bearing 82 may be fittedly mounted into an inner periphery of a respective one of the communicating bores 81, and inner rings (not shown) of the bearing 82 may be fittedly mounted onto an outer periphery of a respective one of the shaft members 83. A stop ring 85 may prevent the outer rings from slipping off. Also, a spacer 86 may be interposed between the inner rings, on one hand, and the respective one of the proximal side end link members 11a, on the other hand. The tightening force of the nut 84 may be transmitted, via the respective one of the proximal side end link members 11a and the spacer 86, to the inner rings so as to apply a predetermined preload to the bearings 82.

In regard to the revolute pair between the respective one of the proximal side end link members 11a and a respective one of the intermediate link members 11b, the respective one of the intermediate link members 11b may have, at opposite ends thereof, respective communicating holes 88 that are formed therein, and two bearings 89 may be arranged in each one of the communicating hole 88. A shaft portion 90 of a free end (tip end) of the respective one of the proximal side end link members 11a may be rotatably supported by means of those bearings 89. The bearings 89 may be secured in place by tightening of a nut 92, with a spacer 91 being interposed therebetween.

The bearings 89 may, for example, comprise a rolling contact bearing such as a deep groove ball bearing. Outer rings (not shown) of the bearing 89 may be fittedly mounted into an inner periphery of a respective one of the communicating holes 88, and inner rings (not shown) of the bearing 89 may be fittedly mounted onto an outer periphery of the shaft portion 90. A stop ring 93 may prevent the outer rings from slipping off. The nut 92 may be screwed on a threaded portion 90a of a free end of the shaft portion 90. The tightening force of the nut 92 may be transmitted via the spacer 91 to the inner rings so as to apply a predetermined preload to the bearings 89.

Although, in the foregoing discussion, reference has only been made to the revolute pairs between the proximal end side link hub 14 and proximal side end link members 11a as well as one of the revolute pairs between the proximal side end link members 11a and intermediate link members 11b, the same designs can also be applied to the revolute pairs between the distal end side link hub 15 and distal side end link members 11c as well as the revolute pairs between the distal side end link members 11c and the intermediate link members 11b (i.e., they are not shown).

In this way, by arranging bearings 82 or 89 in the four revolute pairs in each of the link mechanisms 11, 12 and 13—that is, the revolute pair between the proximal end side link hub 14 and a respective one of the proximal side end link members 11a, 12a or 13a, the revolute pair between the distal end side link hub 15 and a respective one of the distal side end link members 11c, 12c or 13c, the revolute pair between the respective one of the proximal side end link members 11a, 12a or 13a and a respective one of the intermediate link members 11b, 12b or 13b, and the revolute pair between the respective one of the distal side end link members 11c, 12c or 13c and the respective one of the intermediate link members 11b, 12b or 13b—it is possible to reduce frictional resistance at each of the revolute pairs to achieve smaller rotational resistance therein, thus ensuring a smoother power transmission while at the same time improving the durability thereof.

As each one of the actuators 30 is driven into rotation, the rotation thereof may be transmitted via a pair of bevel gears 96 and 97 (FIG. 15) to a respective one of the shaft members 83 so as to change the angle of a respective one of the proximal side end link members 11a, 12a or 13a relative to the proximal end side link hub 14. As a consequence, the posture of the distal end side link hub 15 relative to the proximal end side link hub 14 (which may hereinafter be referred to as "distal end posture") can be created.

The parallel link mechanisms 1A to 1C in accordance with the preceding embodiments may all involve possible allowances such as backlash in a path along which the drive power of the actuators 30 may be transmitted. Therefore, by performing diagnosis using a diagnostic device 51 that is designed in accordance with one of the aforementioned embodiments, the degradation status of parts thereof is accurately diagnosed, and a user is informed of the diagnosis, before the device is rendered inoperable due to, for example, breakage of the parts. As a result, the maintainability of a parallel link mechanism can advantageously and effectively be improved.

Although preferred embodiments of the present invention have been shown and described with reference to the accompanying drawings, those skilled in the art would also readily conceive numerous variants and modifications upon reading the instant specification, without departing from the obvious scope and spirit of the invention. Accordingly, such variants and modifications should be construed as being encompassed within the scope of the present invention that is defined by the appended claims.

REFERENCE NUMERALS

1 . . . link actuation device
1A, 1B, 1C . . . parallel link mechanism
11, 12, 13 . . . link mechanism
11a, 12a, 13a . . . proximal side end link member
11b, 12b, 13b . . . intermediate link member
11c, 12c, 13c . . . distal side end link member
14 . . . proximal end side link hub
15 . . . distal end side link hub
30 . . . actuator
31 . . . speed reducer mechanism
50 . . . control unit
52 . . . preload applicator
53 . . . torque detector
54 . . . determiner
55 . . . memory
56 . . . notifier
57 . . . operation panel
59 . . . operation console

What is claimed is:

1. An apparatus for a link actuation device, the link actuation device including:
   a proximal end side link hub;
   a distal end side link hub;
   three or more link mechanisms, the distal end side link hub being coupled to the proximal end side link hub via the three or more link mechanisms such that posture of the distal end side link hub can be changed; and
   posture control actuators that cooperate to arbitrarily change distal end posture which is defined as posture of the distal end side link hub, relative to the proximal end side link hub, each of the three or more link mechanisms being associated with a respective one of the posture control actuators,
   wherein each of the link mechanisms includes:
   a proximal side end link member having opposite ends, one end of the opposite ends being pivotably coupled to the proximal end side link hub;
   a distal side end link member having opposite ends, one end of the opposite ends being pivotably coupled to the distal end side link hub; and
   an intermediate link member having opposite ends that are pivotably coupled to the other end of the opposite ends of the proximal side end link member and the other end of the opposite ends of the distal side end link member, respectively,
   the apparatus comprising a computer configured to:
   cause each of the actuators to be driven to apply a preload to the link actuation device;
   detect a drive torque of each of the actuators;
   determine whether or not the drive torque of each of the actuators, that is detected as the link actuation device carries out a predetermined action under a predetermined condition, lies within a predetermined range; and
   send a notification to a notification content display, the notification indicating a determination result.

2. The apparatus for the link actuation device as claimed in claim 1, wherein
   the predetermined condition includes at least one of: that the preload is applied; that a load acting on the distal side end link member in the link actuation device lies within a defined range; and that a velocity, at which the distal side end link member moves, lies within a defined range, and
   the predetermined action includes that the link actuation device moves through a predetermined path.

3. The apparatus for the link actuation device as claimed in claim 1, wherein
   the predetermined condition includes that the preload is applied, and
   the predetermined action includes that the link actuation device is positioned.

4. The apparatus for the link actuation device as claimed in claim 1, wherein each of the actuators comprises an electric servo motor.

5. The apparatus for the link actuation device as claimed in claim 1, wherein
   application of the preload to the link actuation device comprises positioning the link actuation device in an initial posture thereof, and effecting for each one of pairs formed by elements composing the link actuation device, which elements are movable to each other in response to actuation of the actuators, to be applied a force such that each movable member is brought closer to the other member within an allowance in the each one of the pairs.

6. The apparatus for the link actuation device as claimed in claim 1, the computer being further configured to:
   store the number of times in which it has been determined to lie outside the predetermined range, and, send a notification different from said notification if the number of times, in which it has been determined to lie outside the predetermined range, exceeds a threshold.

7. The apparatus for the link actuation device as claimed in claim 1, the computer being further configured to:
   store the duration of a period for which it has been determined to lie outside the predetermined range, and send a notification different from said notification if the duration of the period, for which it has been determined to lie outside the predetermined range, is shorter than a threshold.

8. The apparatus for the link actuation device as claimed in claim 1, wherein the notification content display comprises an operation panel equipped to an operation console for operating the link actuation device.

\* \* \* \* \*